US012597130B2

(12) United States Patent
Wang

(10) Patent No.: US 12,597,130 B2
(45) Date of Patent: Apr. 7, 2026

(54) IMAGE PROCESSING APPARATUS, OPERATION METHOD OF IMAGE PROCESSING APPARATUS, AND OPERATION PROGRAM OF IMAGE PROCESSING APPARATUS FOR GENERATING EXAMINATION RESULTS OF NEW MEDICAL EXAMINATIONS

(71) Applicant: FUJIFILM Corporation, Tokyo (JP)

(72) Inventor: Caihua Wang, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 405 days.

(21) Appl. No.: 18/187,649

(22) Filed: Mar. 21, 2023

(65) Prior Publication Data

US 2023/0222656 A1    Jul. 13, 2023

Related U.S. Application Data

(63) Continuation of application No. PCT/JP2021/033190, filed on Sep. 9, 2021.

(30) Foreign Application Priority Data

Sep. 28, 2020    (JP) ................................. 2020-162679

(51) Int. Cl.
*G06T 7/00*          (2017.01)
*G06T 7/30*          (2017.01)
(Continued)

(52) U.S. Cl.
CPC .............. *G06T 7/0012* (2013.01); *G06T 7/30* (2017.01); *G06V 10/761* (2022.01);
(Continued)

(58) Field of Classification Search
None
See application file for complete search history.

(56) References Cited

U.S. PATENT DOCUMENTS 5,754,676 A     5/1998  Komiya et al.
2016/0314600 A1*  10/2016  Nguyen .................. G06F 18/28
(Continued)

FOREIGN PATENT DOCUMENTS

JP          H07284090        10/1995
JP          2008048880        3/2008
(Continued)

OTHER PUBLICATIONS

Abolvardi, A. A., Hamey, L., & Ho-Shon, K. (2019). Registration Based Data Augmentation for Multiple Sclerosis Lesion Segmentation. 2019 Digital Image Computing: Techniques and Applications (DICTA), 1-5. https://doi.org/10.1109/DICTA47822.2019. 8946022 (Year: 2019).*

(Continued)

*Primary Examiner* — Amandeep Saini
*Assistant Examiner* — Caroline Tabancay Duffy
(74) *Attorney, Agent, or Firm* — JCIPRNET

(57) ABSTRACT

An image processing apparatus includes: a processor; and a memory connected to or built in the processor. The processor is configured to generate, as learning data used for training a machine learning model for medical images and examination results of medical examinations, new medical images from a first medical image and a second medical image among a plurality of the medical images according to a generation condition, and generate new examination results by performing calculation based on the generation condition on a first examination result of the medical examination corresponding to the first medical image and a second examination result of the medical examination corresponding to the second medical image.

13 Claims, 13 Drawing Sheets

(51) Int. Cl.
    *G06V 10/74*        (2022.01)
    *G06V 10/764*     (2022.01)
    *G06V 10/774*     (2022.01)

(52) U.S. Cl.
    CPC .......... *G06V 10/764* (2022.01); *G06V 10/774*
        (2022.01); *G06T 2207/30016* (2013.01)

(56) References Cited

U.S. PATENT DOCUMENTS

| | | | | |
|---|---|---|---|---|
| 2020/0082943 | A1* | 3/2020 | Sakaguchi | G06N 20/00 |
| 2020/0226752 | A1* | 7/2020 | Lee | G06T 5/60 |
| 2020/0275857 | A1* | 9/2020 | Lou | G01R 33/50 |
| 2020/0286229 | A1 | 9/2020 | Ogino et al. | |
| 2021/0257094 | A1 | 8/2021 | Takemoto et al. | |

FOREIGN PATENT DOCUMENTS

| | | |
|---|---|---|
| JP | 2017029461 | 2/2017 |
| JP | 2019198376 | 11/2019 |
| JP | 2020144700 | 9/2020 |
| WO | 2019172181 | 9/2019 |
| WO | 2020054803 | 3/2020 |

OTHER PUBLICATIONS

F. Bartel, M. Visser, M. de Ruiter, J. Belderbos, F. Barkhof, H. Vrenken, J.C. de Munck, & M. van Herk. (2019). Non-linear registration improves statistical power to detect hippocampal atrophy in aging and dementia. NeuroImage Clinical, 23. (Year: 2019).*

Nguyen, K. P., Fatt, C. C., Treacher, A., Mellema, C., Trivedi, M. H., & Montillo, A. (2020). Anatomically-Informed Data Augmentation for Functional MRI with Applications to Deep Learning. Medical Imaging 2020: Image Processing, 11313. https://doi.org/10.1117/12.2548630 (Year: 2020).*

Wang, D., Zhang, Y., Zhang, K., & Wang, L. (2020). FocalMix: Semi-Supervised Learning for 3D Medical Image Detection. 2020 IEEE/CVF Conference on Computer Vision and Pattern Recognition (CVPR), 3950-3959. https://doi.org/10.1109/ CVPR42600.2020. 00401 (Year: 2020).*

Maes, F., Vandermeulen, D., & Suetens, P. (2003). Medical image registration using mutual information. Proceedings of the IEEE, 91(10), 1699-1722. https://doi.org/10.1109/JPROC.2003.817864 (Year: 2003).*

Connor Shorten et al., "A survey on Image Data Augmentation for Deep Learning", Journal of Big Data, Jul. 6, 2019, pp. 1-49.

Yuji Tokozume et al., "Between-class Learning for Image Classification", CVPR 2018, Apr. 2018, pp. 5486-5494.

"International Search Report (Form PCT/ISA/210) of PCT/JP2021/033190," mailed on Nov. 30, 2021, with English translation thereof, pp. 1-7.

"Written Opinion of the International Searching Authority (Form PCT/ISA/237) of PCT/JP2021/033190," mailed on Nov. 30, 2021, with English translation thereof, pp. 1-6.

"Search Report of Europe Counterpart Application", issued on Mar. 12, 2024, p. 1-p. 11.

Dong Wang et al., "FocalMix: Semi-Supervised Learning for 3D Medical Image Detection", 2020 IEEE/CVF Conference on Computer Vision and Pattern Recognition (CVPR), Jun. 2020, pp. 3950-3959.

Ava Assadi Abolvardi et al., "Registration Based Data Augmentation for Multiple Sclerosis Lesion Segmentation", 2019 Digital Image Computing: Techniques and Applications (DICTA), Dec. 2019, pp. 1-5.

Krishna Chaitanya et al., "Semi-Supervised and Task-Driven Data Augmentation", arXiv:1902.05396v2 [cs.CV], Feb. 2019, pp. 1-13.

Kevin P. Nguyen, et al., "Anatomically-Informed Data Augmentation for Functional MRI with Applications to Deep Learning", arXiv:1910.08112v1 [cs.LG], Oct. 2019, pp. 1-5.

* cited by examiner

13

HEAD MRI IMAGE

PATIENT ID

22

14

EXAMINATION RESULT

PATIENT ID

22

EXAMINATION RESULT OF BLOOD EXAMINATION
EXAMINATION RESULT OF SPINAL FLUID EXAMINATION
SCORE OF DEMENTIA TEST

29

DISPLAY — 19

INPUT DEVICE — 20

CPU — 27

MEMORY — 26

STORAGE — 25

COMMUNICATION UNIT — 28

10

OUTPUT TRANSFORMATION
AMOUNT AS PROCESSING RESULT

OUTPUT TRANSFORMATION
AMOUNT AS PROCESSING RESULT

FIG. 8

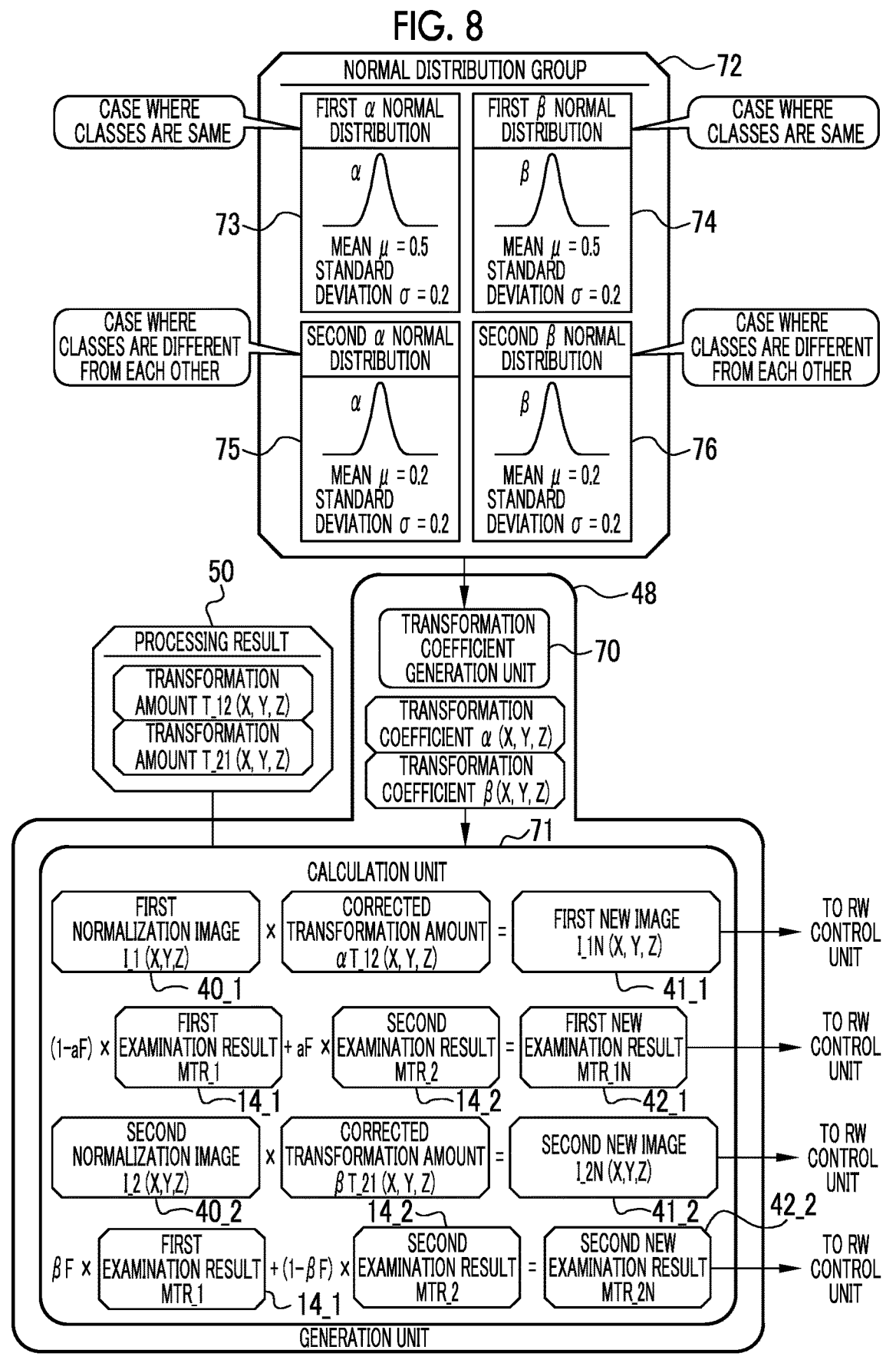

NORMAL DISTRIBUTION GROUP — 72

CASE WHERE CLASSES ARE SAME → FIRST $\alpha$ NORMAL DISTRIBUTION — 73

$\alpha$

MEAN $\mu = 0.5$
STANDARD DEVIATION $\sigma = 0.2$

FIRST $\beta$ NORMAL DISTRIBUTION — 74 ← CASE WHERE CLASSES ARE SAME $\beta$

MEAN $\mu = 0.5$
STANDARD DEVIATION $\sigma = 0.2$

CASE WHERE CLASSES ARE DIFFERENT FROM EACH OTHER → SECOND $\alpha$ NORMAL DISTRIBUTION — 75

$\alpha$

MEAN $\mu = 0.2$
STANDARD DEVIATION $\sigma = 0.2$

SECOND $\beta$ NORMAL DISTRIBUTION — 76 ← CASE WHERE CLASSES ARE DIFFERENT FROM EACH OTHER $\beta$ MEAN $\mu = 0.2$
STANDARD DEVIATION $\sigma = 0.2$

— 48

TRANSFORMATION COEFFICIENT GENERATION UNIT — 70

50

PROCESSING RESULT

TRANSFORMATION AMOUNT T_12 (X, Y, Z)
TRANSFORMATION AMOUNT T_21 (X, Y, Z)

TRANSFORMATION COEFFICIENT $\alpha$ (X, Y, Z)
TRANSFORMATION COEFFICIENT $\beta$ (X, Y, Z)

— 71

CALCULATION UNIT

FIRST NORMALIZATION IMAGE I_1 (X,Y,Z) — 40_1
$\times$
CORRECTED TRANSFORMATION AMOUNT $\alpha$ T_12 (X, Y, Z)
$=$
FIRST NEW IMAGE I_1N (X, Y, Z) — 41_1
→ TO RW CONTROL UNIT $(1-aF) \times$ FIRST EXAMINATION RESULT MTR_1 — 14_1
$+ aF \times$ SECOND EXAMINATION RESULT MTR_2 — 14_2
$=$
FIRST NEW EXAMINATION RESULT MTR_1N — 42_1
→ TO RW CONTROL UNIT SECOND NORMALIZATION IMAGE I_2 (X,Y,Z) — 40_2
$\times$
CORRECTED TRANSFORMATION AMOUNT $\beta$ T_21 (X, Y, Z) — 14_2
$=$
SECOND NEW IMAGE I_2N (X,Y,Z) — 41_2
→ TO RW CONTROL UNIT

42_2

$\beta F \times$ FIRST EXAMINATION RESULT MTR_1 — 14_1
$+ (1-\beta F) \times$ SECOND EXAMINATION RESULT MTR_2
$=$
SECOND NEW EXAMINATION RESULT MTR_2N
→ TO RW CONTROL UNIT

GENERATION UNIT

FIG. 9A

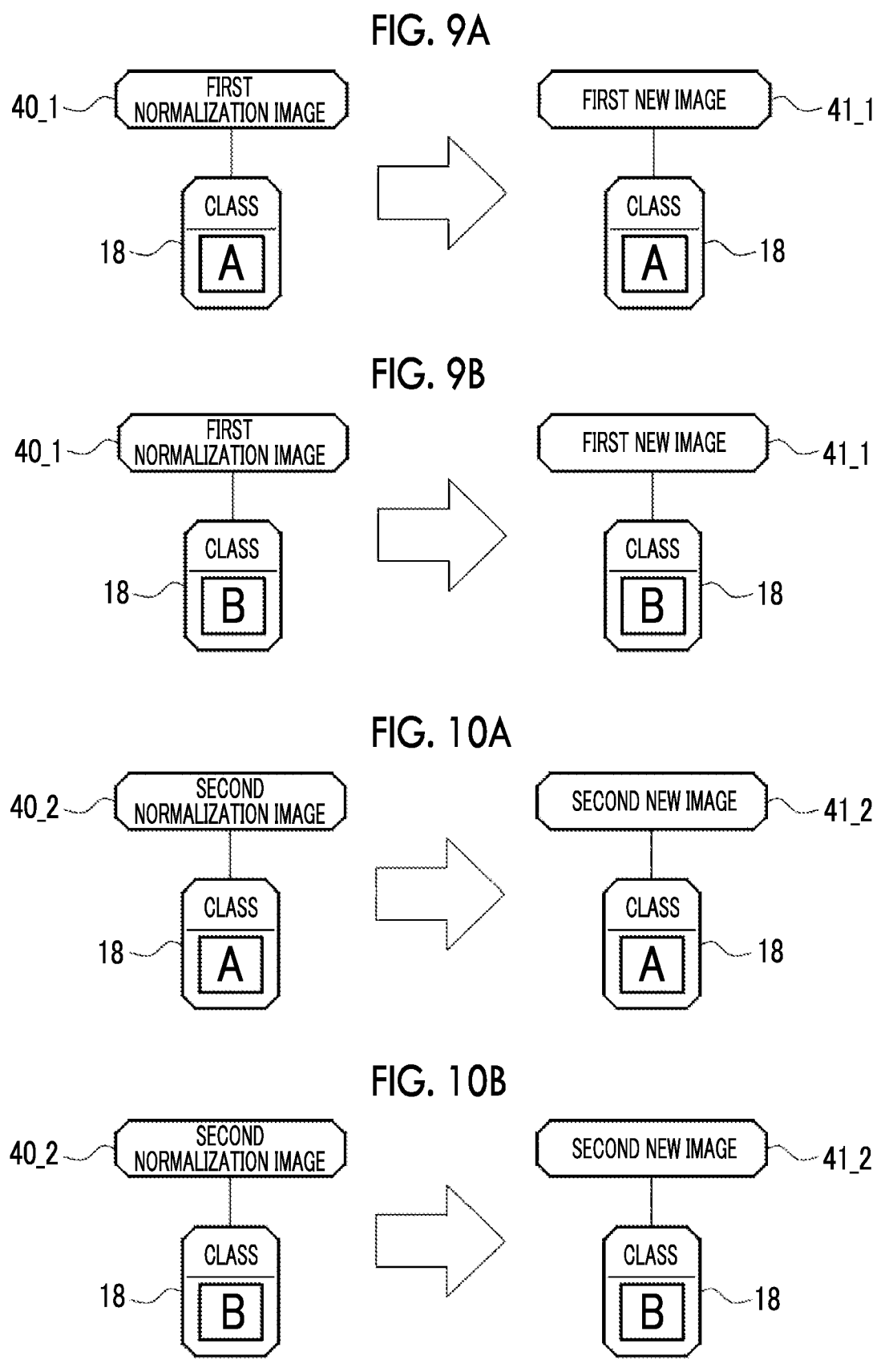

40_1 — FIRST NORMALIZATION IMAGE

CLASS

18 — A

⟹

FIRST NEW IMAGE — 41_1

CLASS

40_1 — FIRST NORMALIZATION IMAGE

CLASS

18 — B

⟹

FIRST NEW IMAGE — 41_1

CLASS

40_2 — SECOND NORMALIZATION IMAGE

CLASS

18 — A

⟹

SECOND NEW IMAGE — 41_2

CLASS

40_2 — SECOND NORMALIZATION IMAGE

CLASS

18 — B

⟹

SECOND NEW IMAGE — 41_2

CLASS

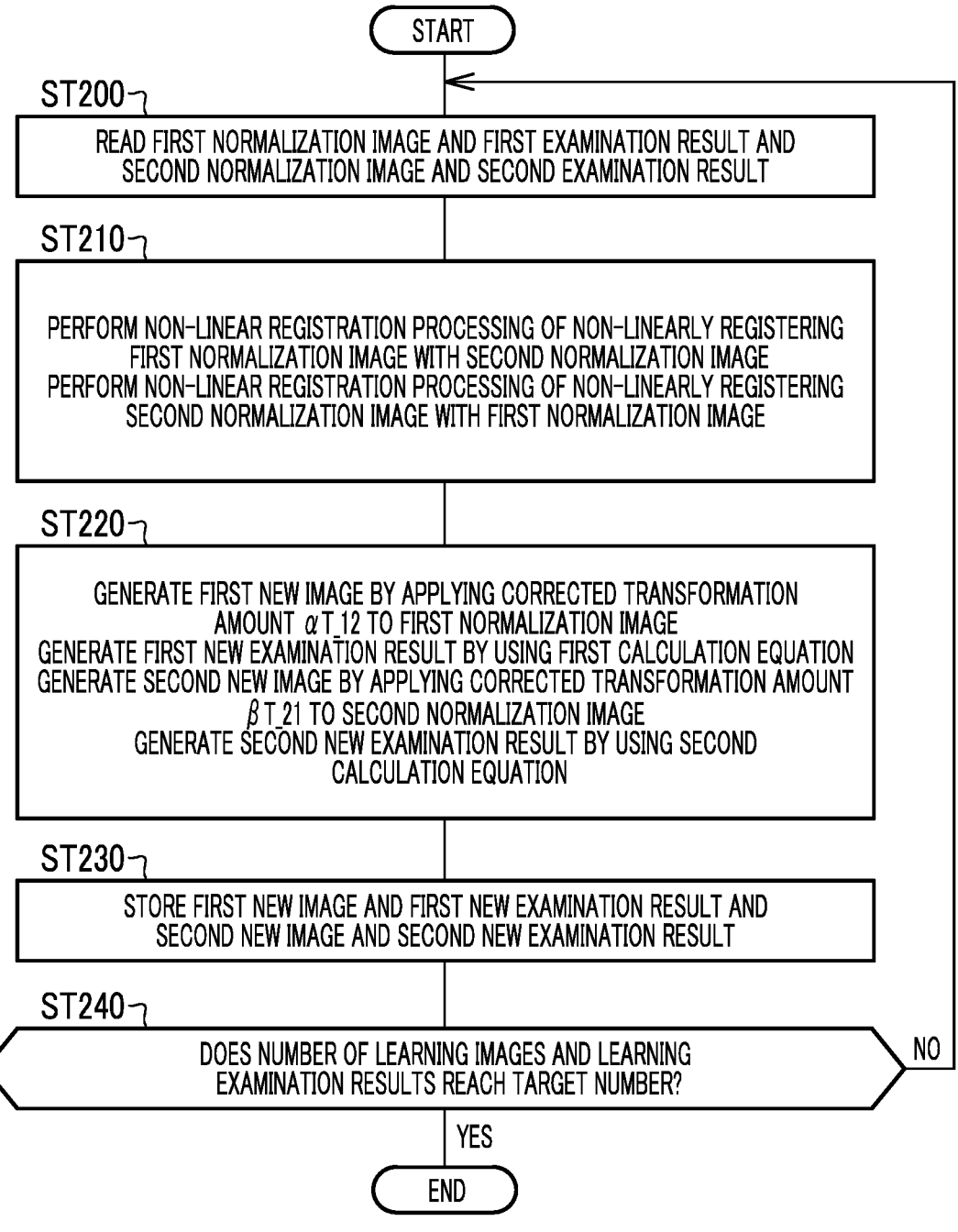

START

ST200 ⌐

READ FIRST NORMALIZATION IMAGE AND FIRST EXAMINATION RESULT AND
SECOND NORMALIZATION IMAGE AND SECOND EXAMINATION RESULT

ST210 ⌐

PERFORM NON-LINEAR REGISTRATION PROCESSING OF NON-LINEARLY REGISTERING
FIRST NORMALIZATION IMAGE WITH SECOND NORMALIZATION IMAGE
PERFORM NON-LINEAR REGISTRATION PROCESSING OF NON-LINEARLY REGISTERING
SECOND NORMALIZATION IMAGE WITH FIRST NORMALIZATION IMAGE

ST220 ⌐

GENERATE FIRST NEW IMAGE BY APPLYING CORRECTED TRANSFORMATION
AMOUNT $\alpha T\_12$ TO FIRST NORMALIZATION IMAGE
GENERATE FIRST NEW EXAMINATION RESULT BY USING FIRST CALCULATION EQUATION
GENERATE SECOND NEW IMAGE BY APPLYING CORRECTED TRANSFORMATION AMOUNT
$\beta T\_21$ TO SECOND NORMALIZATION IMAGE
GENERATE SECOND NEW EXAMINATION RESULT BY USING SECOND
CALCULATION EQUATION

ST230 ⌐

STORE FIRST NEW IMAGE AND FIRST NEW EXAMINATION RESULT AND
SECOND NEW IMAGE AND SECOND NEW EXAMINATION RESULT

ST240 ⌐

DOES NUMBER OF LEARNING IMAGES AND LEARNING          NO
EXAMINATION RESULTS REACH TARGET NUMBER?

YES

END

FIG. 15

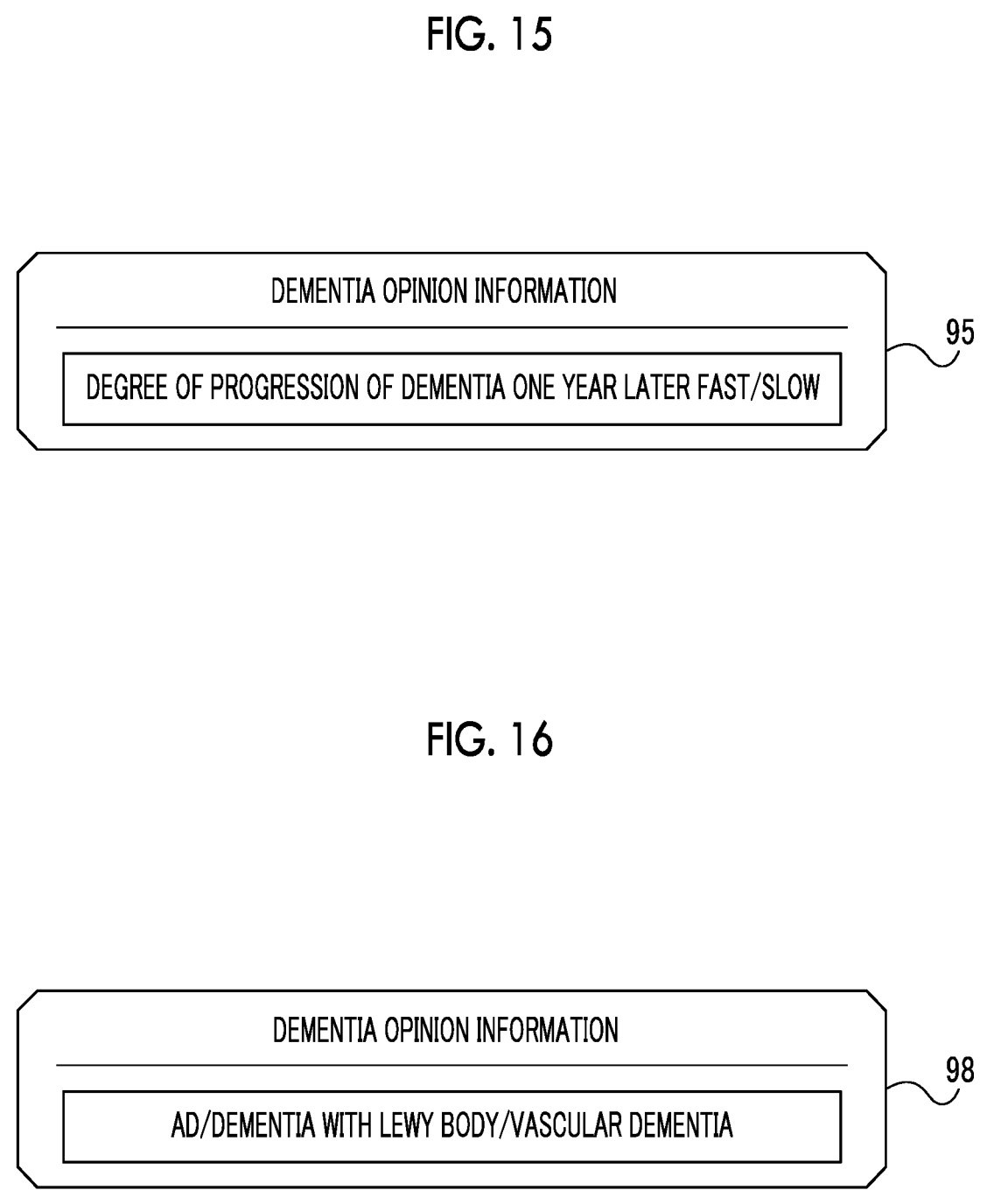

DEMENTIA OPINION INFORMATION

DEGREE OF PROGRESSION OF DEMENTIA ONE YEAR LATER FAST/SLOW

DEMENTIA OPINION INFORMATION

AD/DEMENTIA WITH LEWY BODY/VASCULAR DEMENTIA

98

1

IMAGE PROCESSING APPARATUS, OPERATION METHOD OF IMAGE PROCESSING APPARATUS, AND OPERATION PROGRAM OF IMAGE PROCESSING APPARATUS FOR GENERATING EXAMINATION RESULTS OF NEW MEDICAL EXAMINATIONS

CROSS-REFERENCE TO RELATED APPLICATIONS

This application is a continuation application of International Application No. PCT/JP2021/033190 filed on Sep. 9, 2021, the disclosure of which is incorporated herein by reference in its entirety. Further, this application claims priority from Japanese Patent Application No. 2020-162679 filed on Sep. 28, 2020, the disclosure of which is incorporated herein by reference in its entirety.

BACKGROUND

1. Technical Field

A technique of the present disclosure relates to an image processing apparatus, an operation method of an image processing apparatus, and an operation program of an image processing apparatus.

2. Description of the Related Art

In a medical field, with a recent progress of artificial intelligence techniques, various techniques of inputting medical images to a machine learning model and outputting a disease opinion from the machine learning model have been proposed.

In the machine learning model for the medical images, a plurality of learning images are sequentially input and learned. As the number of the learning images is smaller, the number of times of learning is also reduced. As a result, it is difficult to improve prediction accuracy of output data. For this reason, in the related art, a technique of increasing the number of the learning images by using a data expansion method called data augmentation is used.

As the data expansion method, for example, a method of generating a new image by performing, on one image, various processing such as parallel displacement, rotation, enlargement/reduction, inversion, cropping, and noise addition as described in <C. Shorten, T. M. Khoshgofttar: A survey on Image Data Augmentation, Journal of Big Data, 2019> is well known. Here, in the method described in <C. Shorten, T. M. Khoshgofttar: A survey on Image Data Augmentation, Journal of Big Data, 2019>, only an image similar to one target image is generated. As a result, a variation of the learning image is not increased. For this reason, a method of generating a new image by synthesizing two different images as described in <Y. Tokozume, Y. Ushiku, T. Harada: Between-class Learning for Image Classification, CVPR, 2018> has been proposed. The new image in this case is, for example, an image obtained by averaging pixel values of pixels of two different images.

By the way, in a medical facility, various medical examinations such as a blood examination, a urine examination, and a question-type diagnosis test are performed on a patient. For this reason, even in a machine learning model for medical images, for a purpose of improving prediction accuracy of a disease opinion, examination results of medical examinations such as a blood examination, a urine examination, and a diagnosis test are input in addition to the medical images (for example, refer to JP1995-284090A (JP-H07-284090A)). Such a method is called multimodal learning.

SUMMARY

In a case of combining the data expansion method using two different images as described in <Y. Tokozume, Y. Ushiku, T. Harada: Between-class Learning for Image Classification, CVPR, 2018> and multimodal learning as described in JP1995-284090A (JP-H07-284090A), it is also necessary to newly generate examination results of medical examinations corresponding to new images generated from the two different images. At this time, consistency should be maintained between new examination results and examination results of two medical examinations corresponding to the original two different images.

An embodiment according to the technique of the present disclosure provides an image processing apparatus, an operation method of an image processing apparatus, and an operation program of an image processing apparatus capable of generating examination results of new medical examinations while maintaining consistency in the examination results.

According to an aspect of the present disclosure, there is provided an image processing apparatus including: a processor; and a memory connected to or built in the processor, in which the processor is configured to generate, as learning data used for training a machine learning model for medical images and examination results of medical examinations, new medical images from a first medical image and a second medical image among a plurality of the medical images according to a generation condition, and generate new examination results by performing calculation based on the generation condition on a first examination result of the medical examination corresponding to the first medical image and a second examination result of the medical examination corresponding to the second medical image.

Preferably, the processor is configured to perform non-linear registration processing on the first medical image and the second medical image, generate a first new medical image and a second new medical image by transforming the first medical image and the second medical image under the generation condition according to a result of the non-linear registration processing, and generate a first new examination result corresponding to the first new medical image and a second new examination result corresponding to the second new medical image from the first examination result and the second examination result by using a calculation equation based on the generation condition.

Preferably, the processor is configured to set the first medical image as the first new medical image by applying, to the first medical image, a corrected transformation amount $\alpha T\_12$ obtained by multiplying a transformation amount $T\_12$ from the first medical image to the second medical image in the non-linear registration processing by a transformation coefficient $\alpha$, and convert the first examination result and the second examination result into the first new examination result by calculating a first calculation equation including the transformation coefficient $\alpha$ or a value similar to the transformation coefficient $\alpha$, and set the second medical image as the second new medical image by applying, to the second medical image, a corrected transformation amount $\beta T\_21$ obtained by multiplying a transformation amount $T\_21$ from the second medical image to the first medical image in the non-linear registration processing by a transformation coefficient β, and convert the first examination result and the second examination result into the second new examination result by calculating a second calculation equation including the transformation coefficient β or a value similar to the transformation coefficient β.

Preferably, the medical images are classified into classes, and the processor is configured to change at least one of values of the transformation coefficients α and β, the value similar to the transformation coefficient α, or the value similar to the transformation coefficient β depending on whether classes of the first medical image and the second medical image are the same or different from each other.

Preferably, the processor is configured to set a class of the first new medical image to be the same as the class of the first medical image, and set a class of the second new medical image to be the same as the class of the second medical image.

Preferably, the transformation coefficients α and β are random numbers according to a normal distribution.

Preferably, a mean of a normal distribution in a case where the classes of the first medical image and the second medical image are different from each other is smaller than a mean of a normal distribution in a case where the classes of the first medical image and the second medical image are the same.

Preferably, the processor is configured to generate the new medical images and the new examination results in accordance with a tendency of the examination results of a population of patients treated in the machine learning model.

Preferably, the processor is configured to perform normalization processing of matching the first medical image and the second medical image with a reference medical image prior to generation of the new medical images.

Preferably, the medical image is an image in which a head of a patient appears, and the machine learning model is a model that outputs a dementia opinion on the patient.

According to another aspect of the present disclosure, there is provided an operation method of an image processing apparatus, the method including: generating, as learning data used for training a machine learning model for medical images and examination results of medical examinations, new medical images from a first medical image and a second medical image among a plurality of the medical images according to a generation condition; and generating new examination results by performing calculation based on the generation condition on a first examination result of the medical examination corresponding to the first medical image and a second examination result of the medical examination corresponding to the second medical image.

According to still another aspect of the present disclosure, there is provided an operation program of an image processing apparatus, the program causing a computer to execute a process including: generating, as learning data used for training a machine learning model for medical images and examination results of medical examinations, new medical images from a first medical image and a second medical image among a plurality of the medical images according to a generation condition; and generating new examination results by performing calculation based on the generation condition on a first examination result of the medical examination corresponding to the first medical image and a second examination result of the medical examination corresponding to the second medical image.

According to the technique of the present disclosure, it is possible to provide an image processing apparatus, an operation method of an image processing apparatus, and an operation program of an image processing apparatus capable of generating examination results of new medical examinations while maintaining consistency in the examination results.

BRIEF DESCRIPTION OF THE DRAWINGS

Exemplary embodiments according to the technique of the present disclosure will be described in detail based on the following figures, wherein:

FIG. 1 is a diagram illustrating an image processing apparatus and the like;

FIG. 8 is a diagram illustrating details of a generation unit;

FIGS. 9A and 9B are diagrams illustrating processing of the generation unit, FIG. 9A illustrates a case where a class of a first normalization image is "A", and FIG. 9B illustrates a case where a class of a first normalization image is "B";

FIGS. 10A and 10B are diagrams illustrating processing of the generation unit, FIG. 10A illustrates a case where a class of a second normalization image is "A", and FIG. 10B illustrates a case where a class of a second normalization image is "B";

FIG. 13 is a flowchart illustrating a processing procedure of the image processing apparatus;

FIG. 15 is a diagram illustrating another example of dementia opinion information;

FIG. 16 is a diagram illustrating still another example of dementia opinion information.

DETAILED DESCRIPTION

First Embodiment

Figure 1:
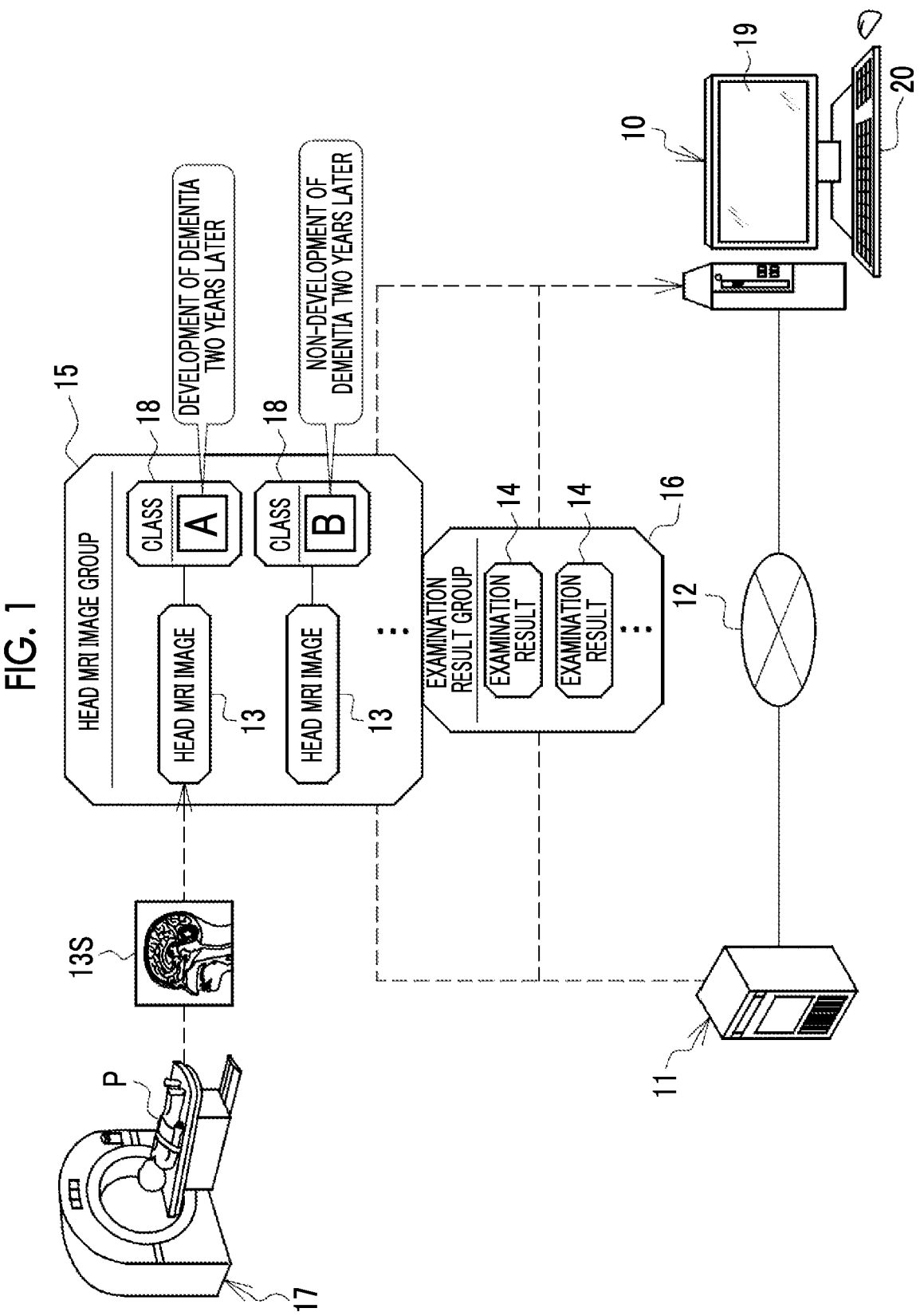

As illustrated in FIG. 1 as an example, an image processing apparatus 10 is connected to a medical information database server 11 via a network 12. The medical information database server 11 stores and manages various medical information uploaded from a plurality of medical facilities via the network 12. The medical information includes a head magnetic resonance imaging (MRI) image 13 and an examination result 14 of a medical examination. The network 12 is, for example, a wide area network (WAN) such as the Internet or a public communication network. In a case where the WAN is used, it is preferable to configure a virtual private network (VPN) or to use a communication protocol having a high security level such as a hypertext transfer protocol secure (HTTPS) in consideration of information security.

The image processing apparatus 10 receives a head MRI image group 15 and an examination result group 16 distributed from the medical information database server 11. The head MRI image group 15 includes a plurality of head MRI images 13 that are allowed to be provided from medical facilities, for example, head MRI images 13 that are captured at a plurality of medical facilities from ten years ago to two years ago. The examination result group 16 includes a plurality of examination results 14 that are allowed to be provided from medical facilities and are examination results 14 of the patient P same as the patient of the head MRI images 13 of the head MRI image group 15.

The head MRI image 13 is obtained by imaging a head of a patient P by an MRI apparatus 17. The head MRI image 13 is voxel data representing a three-dimensional shape of the head of the patient P. In FIG. 1, a head MRI image 13S having a sagittal cross section is illustrated. The head MRI image 13 is an example of a "medical image" and an "image in which a head of a patient appears" according to the technique of the present disclosure.

A class 18 is associated with the head MRI image 13, and thus the head MRI images 13 are classified into classes. In the class 18, "A" is registered in a case where the patient P of the head MRI image 13 develops dementia two years later, and "B" is registered in a case where the patient P of the head MRI image 13 does not develop dementia two years later. The registration of the class 18 is performed by a doctor in charge of the patient P.

The image processing apparatus 10 is, for example, a desktop personal computer, and includes a display 19 and an input device 20. The input device 20 is a keyboard, a mouse, a touch panel, a microphone, or the like. An operator of the image processing apparatus 10 transmits a distribution request of the head MRI image group 15 and the examination result group 16 to the medical information database server 11 by operating the input device 20. The medical information database server 11 searches for the head MRI image group 15 and the examination result group 16 of which the distribution request is received, and distributes the head MRI image group 15 and the examination result group 16 to the image processing apparatus 10.

Figure 2:
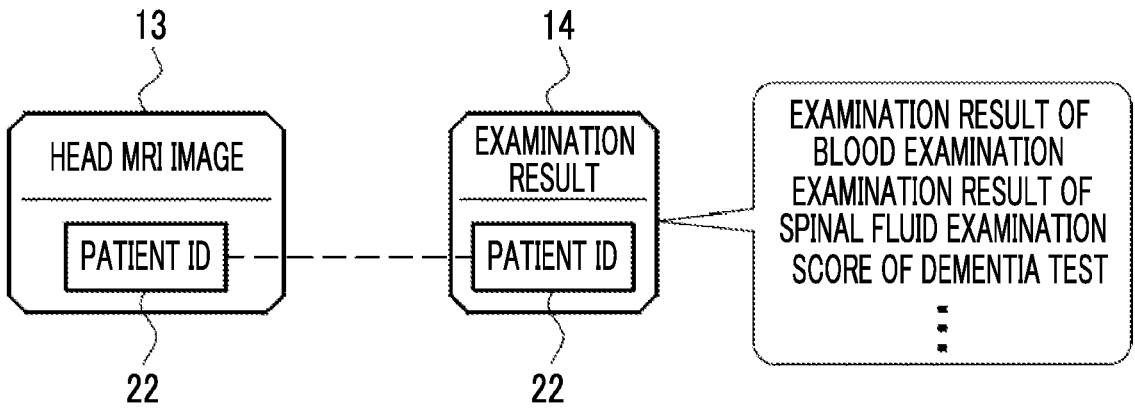
FIG. 2 is a diagram illustrating a relationship between a head MRI image and an examination result and content of the examination result.

As illustrated in FIG. 2 as an example, the head MRI image 13 and the examination result 14 are associated with each other by, for example, patient identification data (ID) 22 for uniquely identifying the patient P. The examination result 14 includes an examination result of a blood examination, an examination result of a spinal fluid examination, a score of a dementia test, and the like. The examination result of the blood examination includes, for example, a measured value of apolipoprotein, a measured value of complement protein, a measured value of transthyretin, and the like. The examination result of the spinal fluid examination includes, for example, a measured value of amyloid β, a measured value of tau protein, and the like. The score of the dementia test includes, for example, a score of revised Hasegawa's dementia scale (HDS-R), a score of mini-mental state examination (MMSE), a score of a rivermead behavioural memory test (RBMT), clinical dementia rating (CDR), activities of daily living (ADL), Alzheimer's disease assessment scale-cognitive subscale (ADAS-Cog), and the like.

Figure 3:
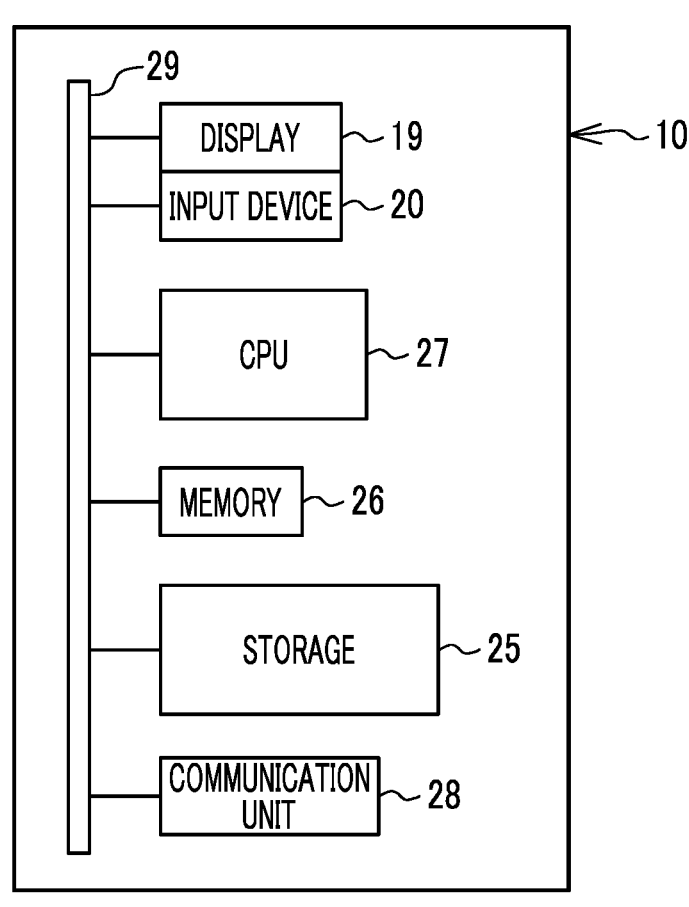
FIG. 3 is a block diagram illustrating a computer including the image processing apparatus.

As illustrated in FIG. 3 as an example, a computer including the image processing apparatus 10 includes a storage 25, a memory 26, a central processing unit (CPU) 27, and a communication unit 28, in addition to the display 19 and the input device 20. The components are connected to each other via a bus line 29. The CPU 27 is an example of a "processor" according to the technique of the present disclosure.

The storage 25 is a hard disk drive that is built in the computer including the image processing apparatus 10 or is connected via a cable or a network. Alternatively, the storage 25 is a disk array in which a plurality of hard disk drives are connected in series. The storage 25 stores a control program such as an operating system, various application programs, and various data associated with the programs. A solid state drive may be used instead of the hard disk drive.

The memory 26 is a work memory which is necessary to execute processing by the CPU 27. The CPU 27 loads the program stored in the storage 25 into the memory 26, and executes processing according to the program. Thereby, the CPU 27 collectively controls each unit of the computer. The communication unit 28 controls transmission of various types of information to an external apparatus such as the medical information database server 11. The memory 26 may be built in the CPU 27.

Figure 4:
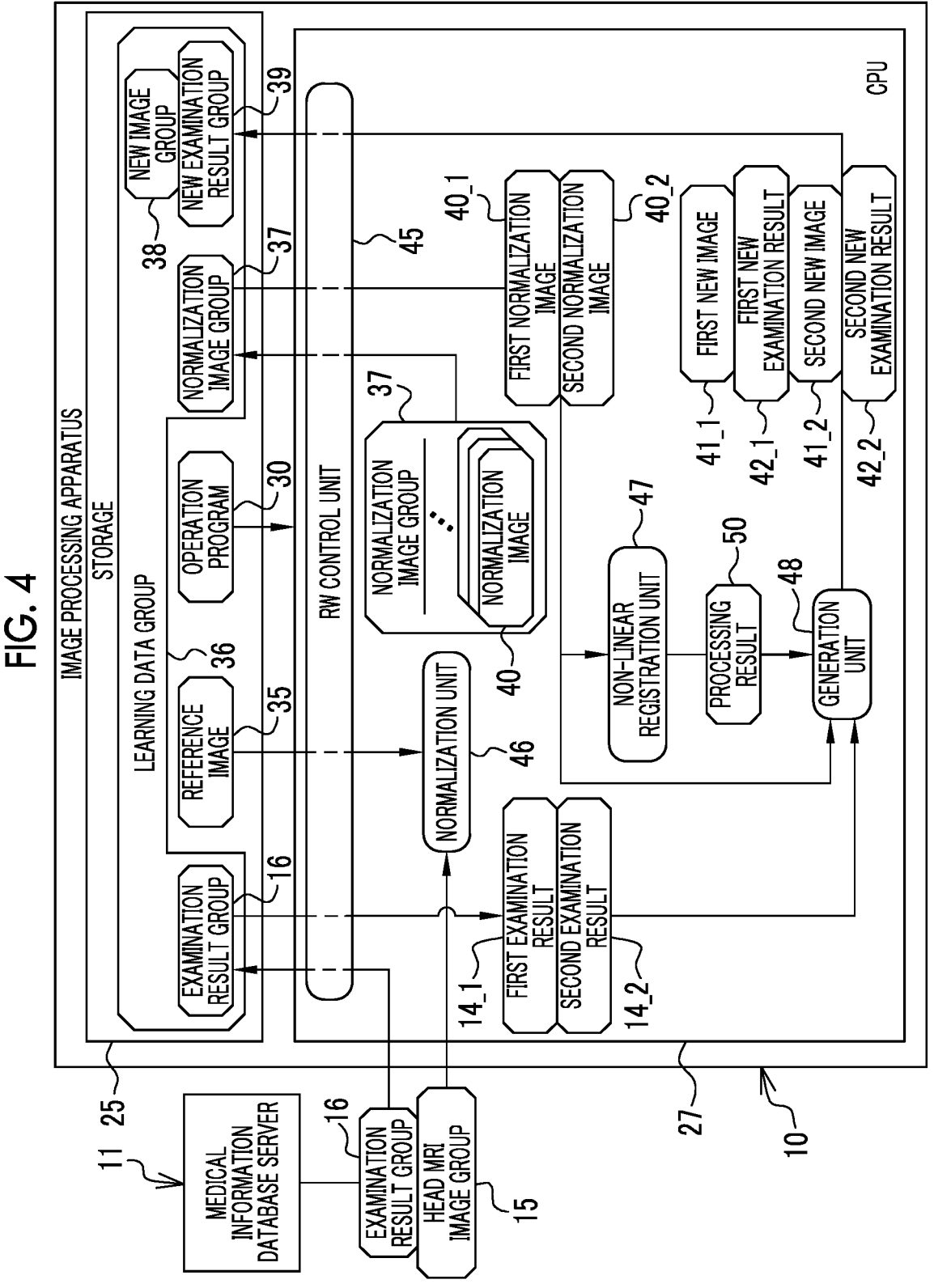
FIG. 4 is a block diagram illustrating a processing unit of a CPU of the image processing apparatus.

As illustrated in FIG. 4 as an example, an operation program 30 is stored in the storage 25 of the image processing apparatus 10. The operation program 30 is an application program for causing the computer to function as the image processing apparatus 10. That is, the operation program 30 is an example of "the operation program of the image processing apparatus" according to the technique of the present disclosure.

A reference head MRI image (hereinafter, abbreviated as a reference image) 35 and a learning data group 36 are also stored in the storage 25. The learning data group 36 is a set of a plurality of learning head MRI images (hereinafter, abbreviated as learning images) 81 (refer to FIG. 11), which are used for training a dementia opinion derivation model 80 (refer to FIG. 11), and a plurality of learning examination results 82 (refer to FIG. 11). The learning data group 36 includes a normalization head MRI image group (hereinafter, abbreviated as a normalization image group) 37, a new head MRI image group (hereinafter, abbreviated as a new image group) 38, an examination result group 16, and a new examination result group 39. The normalization image group 37 includes a plurality of normalization head MRI images (hereinafter, abbreviated as normalization images) 40. The new image group 38 includes a plurality of first new head MRI images (hereinafter, abbreviated as first new images) 41_1 and a plurality of second new head MRI images (hereinafter, abbreviated as second new images) 41_2 (refer to FIG. 11). In addition, the new examination result group 39 includes a plurality of first new examination results 42_1 and a plurality of second new examination results 42_2 (refer to FIG. 11). The first new image 41_1 and the second new image 41_2 are an example of "new medical images" according to the technique of the present disclosure. In addition, the first new examination result 42_1 and the second new examination result 42_2 are an example of "new examination results" according to the technique of the present disclosure.

In a case where the operation program 30 is started, the CPU 27 of the computer including the image processing apparatus 10 functions as a read/write (hereinafter, abbreviated as RW) control unit 45, a normalization unit 46, a non-linear registration unit 47, and a generation unit 48, in cooperation with the memory 26 and the like.

The RW control unit 45 controls storing of various types of data in the storage 25 and reading of various types of data in the storage 25. For example, the RW control unit 45 reads the reference image 35 from the storage 25, and outputs the read reference image 35 to the normalization unit 46. In addition, the RW control unit 45 receives the examination result group 16 from the medical information database server 11, and stores the received examination result group 16 in the storage 25, as a part of the learning data group 36. In addition, the RW control unit 45 receives the normalization image group 37 from the normalization unit 46, and stores the received normalization image group 37 in the storage 25, as a part of the learning data group 36.

The RW control unit 45 reads a first examination result 14_1 and a second examination result 14_2, which are two examination results 14 among the plurality of examination results 14 of the examination result group 16, from the storage 25, and outputs the read first examination result 14_1 and the read second examination result 14_2 to the generation unit 48. In addition, the RW control unit 45 reads the first normalization image 40_1 and the second normalization image 40_2, which are two normalization images 40 among the plurality of normalization images 40 of the normalization image group 37 and correspond to the first examination result 14_1 and the second examination result 14_2, from the storage 25, and outputs the read first normalization image 40_1 and the read second normalization image 40_2 to the non-linear registration unit 47 and the generation unit 48. The first examination result 14_1 and the second examination result 14_2 and the first normalization image 40_1 and the second normalization image 40_2 are the examination results 14 and the normalization images 40 of two patients P having the same attributes such as a gender and an age. The normalization image 40 is associated with the class 18 based on the original head MRI image 13 (refer to FIGS. 9A to 10B).

The normalization unit 46 performs normalization processing of matching the head MRI image 13 with the reference image 35, and sets the head MRI image 13 as the normalization image 40. The normalization unit 46 performs normalization processing on all of the plurality of head MRI images 13 included in the head MRI image group 15. Thereby, a plurality of normalization images 40 corresponding to the plurality of head MRI images 13 included in the head MRI image group 15 are generated. The normalization unit 46 outputs a normalization image group 37 including the plurality of normalization images 40 to the RW control unit 45.

The reference image 35 is a head MRI image in which a brain having a reference shape, a reference size, and a reference shade (pixel value) appears. The reference image 35 is, for example, an image generated by averaging head MRI images 13 of a plurality of healthy persons, or an image generated by computer graphics. The reference image 35 is an example of a "reference medical image" according to the technique of the present disclosure.

The non-linear registration unit 47 performs non-linear registration processing on the first normalization image 40_1 and the second normalization image 40_2. The non-linear registration unit 47 outputs a processing result 50, which is a result of the non-linear registration processing, to the generation unit 48.

The generation unit 48 generates a first new image 41_1 from the first normalization image 40_1 by transforming the first normalization image 40_1 under a generation condition according to the processing result 50, and generates a second new image 41_2 from the second normalization image 40_2 by transforming the second normalization image 40_2 under a generation condition according to the processing result 50. In addition, the generation unit 48 generates a first new examination result 42_1 corresponding to the first new image 41_1 from the first examination result 14_1, and generates a second new examination result 42_2 corresponding to the second new image 41_2 from the second examination result 14_2. The generation unit 48 outputs the first new image 41_1, the first new examination result 42_1, the second new image 41_2, and the second new examination result 42_2 to the RW control unit 45. The RW control unit 45 stores the first new image 41_1 and the second new image 41_2 in the storage 25, as a part of the new image group 38 and a part of the learning data group 36. Further, the RW control unit 45 stores the first new examination result 42_1 and the second new examination result 42_2 in the storage 25, as a part of the new examination result group 39 and a part of the learning data group 36. The first new image 41_1 is an example of a "first new medical image" according to the technique of the present disclosure. In addition, the second new image 41_2 is an example of a "second new medical image" according to the technique of the present disclosure.

Figure 5:
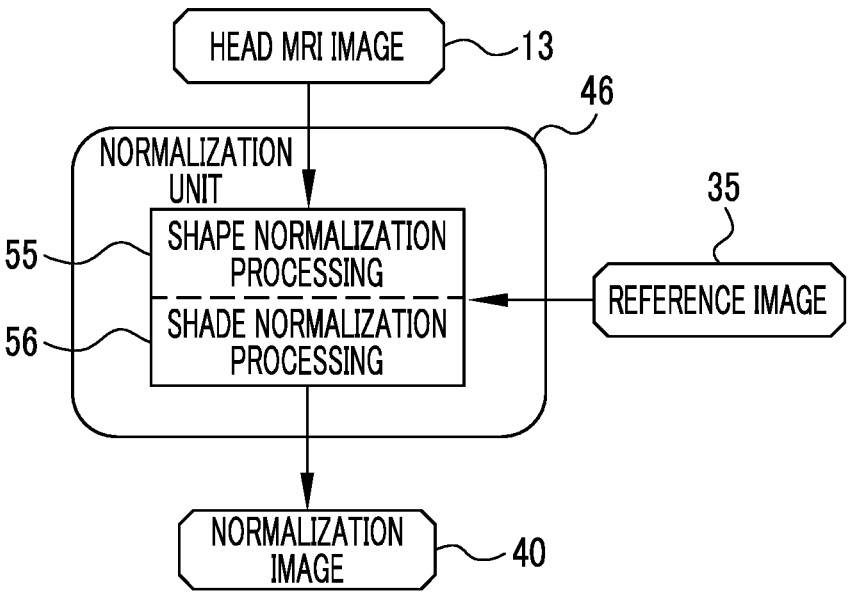
FIG. 5 is a diagram illustrating processing of a normalization unit.

As illustrated in FIG. 5 as an example, the normalization unit 46 performs, as normalization processing, shape normalization processing 55 and shade normalization processing 56 on the head MRI image 13. The shape normalization processing 55 is processing of extracting, for example, landmarks serving as references for registration from the head MRI image 13 and the reference image 35, and performing parallel displacement, rotation, and/or enlargement/reduction of the head MRI image 13 in accordance with the reference image 35 such that a correlation between the landmark of the head MRI image 13 and the landmark of the reference image 35 is maximized. The shade normalization processing 56 is, for example, processing of correcting a shade histogram of the head MRI image 13 in accordance with a shade histogram of the reference image 35.

Figure 6:
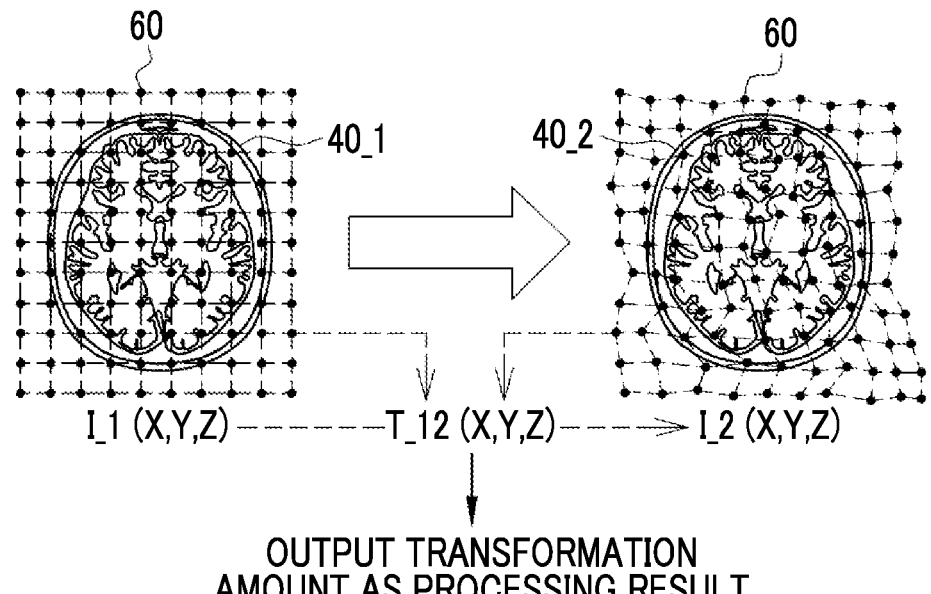
FIG. 6 is a diagram illustrating processing of a non-linear registration unit.

As illustrated in FIG. 6 as an example, in a case where the first normalization image 40_1 (denoted as I_1 (X, Y, Z)) is non-linearly registered with the second normalization image 40_2 (denoted as I_2 (X, Y, Z)), the non-linear registration unit 47 sets, on the first normalization image 40_1, a plurality of control points 60 which are arranged in a grid pattern at equal intervals. In addition, the non-linear registration unit 47 moves each control point 60 to a position at which a local similarity between the first normalization image 40_1 and the second normalization image 40_2 is increased. The non-linear registration unit 47 derives, from a movement amount of each control point 60, a transformation amount T_12 (X, Y, Z) of each pixel in a case where the first normalization image 40_1 is registered with the second normalization image 40_2, by using an interpolation approximation curve such as a B-Spline curve. The non-linear registration unit 47 outputs the derived transformation amount T_12 (X, Y, Z) as a processing result 50.

Figure 7:
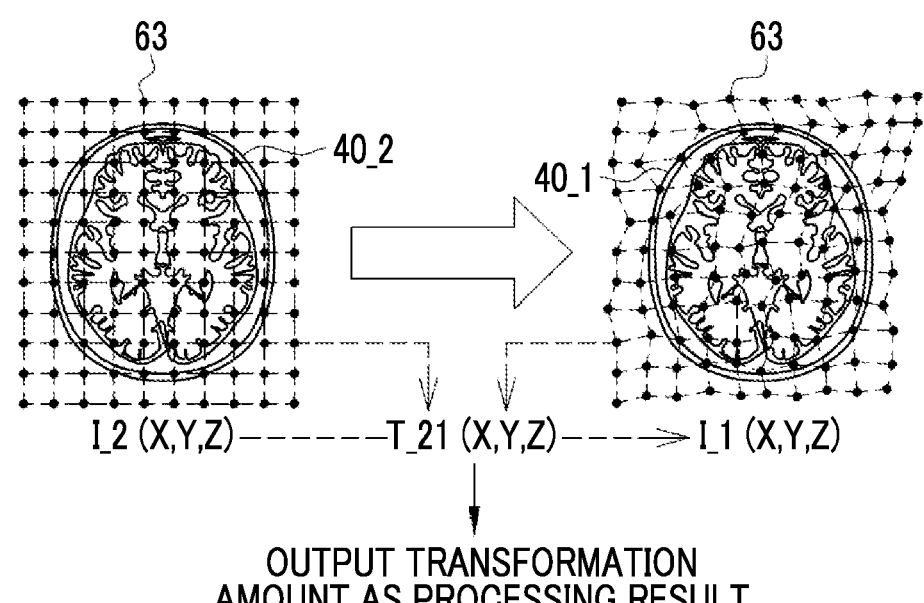
FIG. 7 is a diagram illustrating processing of the non-linear registration unit.

Further, as illustrated in FIG. 7 as an example, in a case where the second normalization image 40_2 is non-linearly registered with the first normalization image 40_1, the non-linear registration unit 47 sets, on the second normalization image 40_2, control points 63 which are same as the control points 60. In addition, the non-linear registration unit 47 moves each control point 63 as in the case of FIG. 6. As in the case of FIG. 6, the non-linear registration unit 47 derives, from a movement amount of each control point 63, a transformation amount T_21 (X, Y, Z) of each pixel in a case where the second normalization image 40_2 is registered with the first normalization image 40_1. The non-linear registration unit 47 outputs the derived transformation amount T_21 (X, Y, Z) as a processing result 50. In the following, (X, Y, Z) may be omitted.

FIG. 6 and FIG. 7 illustrate a state where the control points 60 and 63 are set in a two-dimensional shape on the first normalization image 40_1 and the second normalization image 40_2 having axial cross sections. On the other hand, the control points 60 and 63 are actually set in a three-dimensional shape. The transformation amount T_12 (X, Y, Z) and the transformation amount T_21 (X, Y, Z) have an inverse function relationship with each other. Thus, in a case where one of the transformation amount T_12 (X, Y, Z) and the transformation amount T_21 (X, Y, Z) is derived by a method using the control points 60 or 63, the other of the transformation amount T_12 (X, Y, Z) and the transformation amount T_21 (X, Y, Z) may be derived by obtaining an inverse function of one of the transformation amount T_12 (X, Y, Z) and the transformation amount T_21 (X, Y, Z).

As illustrated in FIG. 8 as an example, the generation unit 48 includes a transformation coefficient generation unit 70 and a calculation unit 71. The transformation coefficient generation unit 70 generates transformation coefficients α (X, Y, Z) and β (X, Y, Z) based on a normal distribution group 72. The transformation coefficient generation unit 70 outputs the generated transformation coefficients α (X, Y, Z) and β (X, Y, Z) to the calculation unit 71. The transformation coefficients α (X, Y, Z) and β (X, Y, Z) are values larger than 0 and smaller than 1 (0<α, β<1).

The normal distribution group 72 includes a first α normal distribution 73, a first β normal distribution 74, a second α normal distribution 75, and a second β normal distribution 76. The transformation coefficient generation unit 70 outputs, as the transformation coefficients α (X, Y, Z) and β (X, Y, Z), a random number according to any one normal distribution of the first α normal distribution 73, the first β normal distribution 74, the second α normal distribution 75, and the second β normal distribution 76. The frequency of occurrence of the random number is, for example, for each pixel.

The first α normal distribution 73 and the first β normal distribution 74 are used in a case where the classes 18 of the first normalization image 40_1 and the second normalization image 40_2 are the same. On the other hand, the second α normal distribution 75 and the second β normal distribution 76 are used in a case where the classes 18 of the first normalization image 40_1 and the second normalization image 40_2 are different from each other. The first α normal distribution 73 and the first β normal distribution 74 have a mean μ=0.5 and a standard deviation σ=0.2. On the other hand, the second α normal distribution 75 and the second β normal distribution 76 have a mean μ=0.2 and a standard deviation σ=0.2. That is, the means μ of the second α normal distribution 75 and the second β normal distribution 76 are smaller than the means μ of the first α normal distribution 73 and the first β normal distribution 74. Therefore, values of the transformation coefficients α (X, Y, Z) and β (X, Y, Z) are changed depending on whether the classes 18 of the first normalization image 40_1 and the second normalization image 40_2 are the same or different from each other. The first α normal distribution 73 and the first β normal distribution 74 are examples of "normal distributions in a case where the classes of the first medical image and the second medical image are the same" according to the technique of the present disclosure. In addition, the second α normal distribution 75 and the second β normal distribution 76 are examples of "normal distributions in a case where the classes of the first medical image and the second medical image are different from each other" according to the technique of the present disclosure.

The calculation unit 71 multiplies the transformation coefficient α (X, Y, Z) by the transformation amount T_12 (X, Y, Z) from the first normalization image 40_1 to the second normalization image 40_2, and sets a value obtained by the multiplication, as a corrected transformation amount αT_12 (X, Y, Z). In addition, the calculation unit 71 multiplies the transformation coefficient β (X, Y, Z) by the transformation amount T_21 (X, Y, Z) from the second normalization image 40_2 to the first normalization image 40_1, and sets a value obtained by the multiplication, as a corrected transformation amount βT_21 (X, Y, Z). The calculation unit 71 sets the first normalization image 40_1 as the first new image 41_1 (denoted as I_1N (X, Y, Z)) by applying the corrected transformation amount αT_12 (X, Y, Z) to the first normalization image 40_1. In addition, the calculation unit 71 sets the second normalization image 40_2 as the second new image 41_2 (denoted as I_2N (X, Y, Z)) by applying the corrected transformation amount βT_21 (X, Y, Z) to the second normalization image 40_2. The corrected transformation amount αT_12 (X, Y, Z) and the corrected transformation amount βT_21 (X, Y, Z) are an example of a "generation condition" according to the technique of the present disclosure.

The calculation unit 71 converts the first examination result 14_1 and the second examination result 14_2 into a first new examination result 42_1 (denoted as MTR_1N) by calculating Equation (1), which indicates a weighted average of the first examination result 14_1 (denoted as MTR_1) and the second examination result 14_2 (denoted as MTR_2) and indicates a weighted average by the coefficient αF. The coefficient αF is a fixed value, and is an example of a "value similar to the transformation coefficient α" according to the technique of the present disclosure. More specifically, in a case where the classes 18 of the first normalization image 40_1 and the second normalization image 40_2 are the same and the first α normal distribution 73 is used, the coefficient αF is, for example, 0.5 which is the same as the mean μ of the first α normal distribution 73. On the other hand, in a case where the classes 18 of the first normalization image 40_1 and the second normalization image 40_2 are different from each other and the second α normal distribution 75 is used, the coefficient αF is, for example, 0.2 which is the same as the mean μ of the second α normal distribution 75. Equation (1) is an example of a "calculation equation" and a "first calculation equation" according to the technique of the present disclosure.

$$(1-\alpha F)\times MTR\_1+\alpha F\times MTR\_2=MTR\_1N \tag{1}$$

For example, in a case where αF=0.5 and the first examination result 14_1 and the second examination result 14_2 are MTR_1=28 points and MTR_2=22 points as scores of HDS-R, the first new examination result 42_1 (MTR_1N) is 0.5×28+0.5×22=25 by Equation (1).

In addition, the calculation unit 71 converts the first examination result 14_1 and the second examination result 14_2 into a second new examination result 42_2 (denoted as MTR_2N) by calculating Equation (2), which indicates a weighted average of the first examination result 14_1 and the second examination result 14_2 and indicates a weighted average by the coefficient βF. Similar to the coefficient αF, the coefficient βF is also a fixed value, and is an example of a "value similar to the transformation coefficient β" according to the technique of the present disclosure. More specifically, in a case where the classes 18 of the first normalization image 40_1 and the second normalization image 40_2 are the same and the first β normal distribution 74 is used, the coefficient βF is, for example, 0.5 which is the same as the mean μ of the first β normal distribution 74. On the other hand, in a case where the classes 18 of the first normalization image 40_1 and the second normalization image 40_2 are different from each other and the second β normal distribution 76 is used, the coefficient βF is, for example, 0.2 which is the same as the mean μ of the second β normal distribution 76. Equation (2) is an example of a "calculation equation" and a "second calculation equation" according to the technique of the present disclosure.

$$\beta F \times MTR\_1 + (1 - \beta F) \times MTR\_2 = MTR\_2N \qquad (2)$$

For example, in a case where βF=0.2 and the first examination result 14_1 and the second examination result 14_2 are MTR_1=40 mg/dL and MTR_2=32 mg/dL as measured values of transthyretin, the second new examination result 42_2 (MTR_2N) is 0.2×40+0.8×32=33.6 by Equation (2).

As illustrated in FIGS. 9A and 9B as an example, the generation unit 48 sets the class of the first new image 41_1 to be the same as the class 18 of the first normalization image 40_1. More specifically, in a case where the class 18 of the first normalization image 40_1 is "A" as illustrated in FIG. 9A, the class 18 of the first new image 41_1 is also set to "A". In addition, in a case where the class 18 of the first normalization image 40_1 is "B" as illustrated in FIG. 9B, the class 18 of the first new image 41_1 is also set to "B".

Similarly, as illustrated in FIGS. 10A and 10B as an example, the generation unit 48 sets the class of the second new image 41_2 to be the same as the class 18 of the second normalization image 40_2. More specifically, in a case where the class 18 of the second normalization image 40_2 is "A" as illustrated in FIG. 10A, the class 18 of the second new image 41_2 is also set to "A". In addition, in a case where the class 18 of the second normalization image 40_2 is "B" as illustrated in FIG. 10B, the class 18 of the second new image 41_2 is also set to "B".

Figure 11:
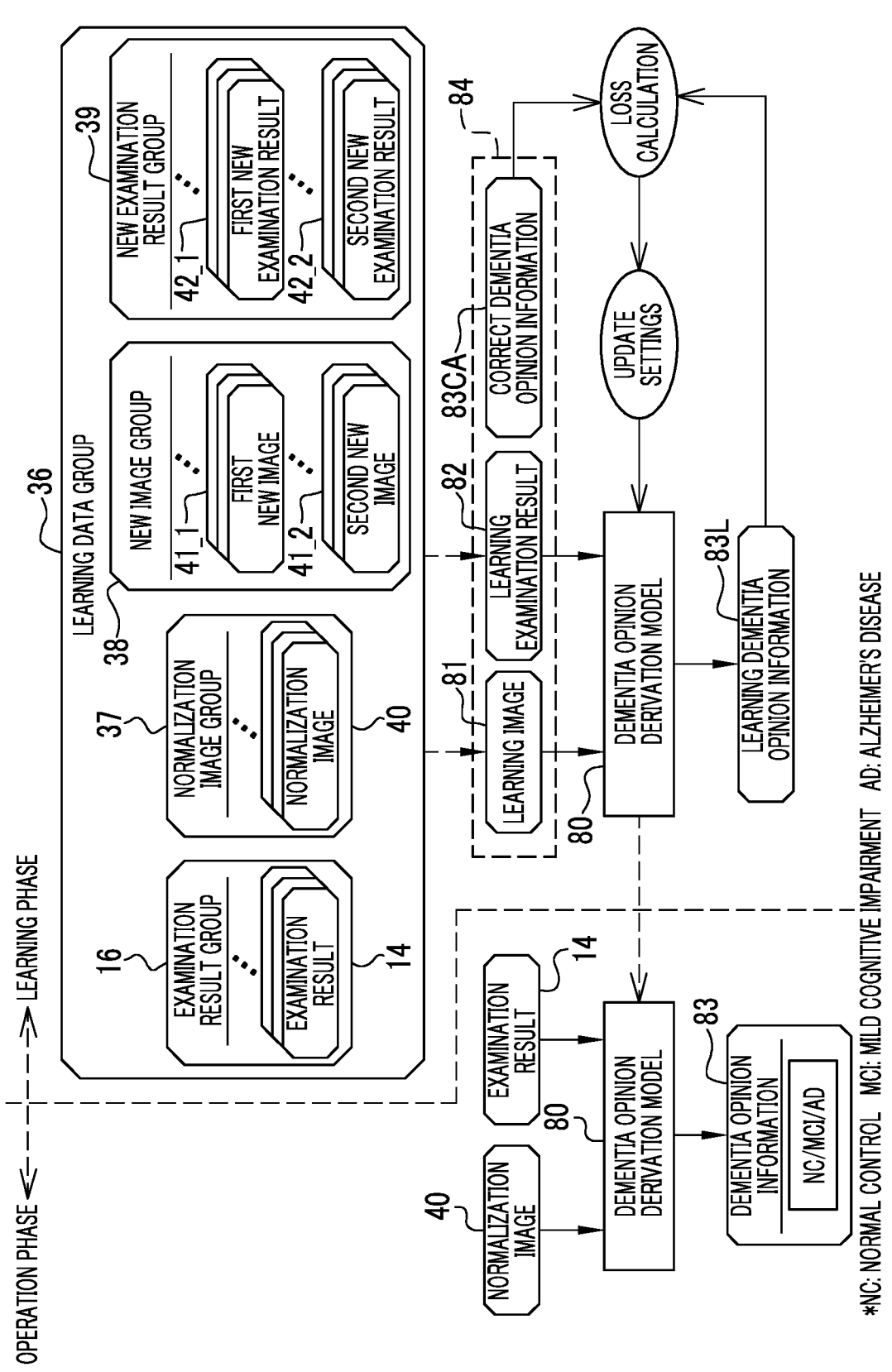
FIG. 11 is a diagram illustrating an outline of processing in a learning phase and an operation phase of a dementia opinion derivation model.

As illustrated in FIG. 11 as an example, in the learning data group 36, the plurality of normalization images 40 included in the normalization image group 37, and one image among the plurality of first new images 41_1 and the plurality of second new images 41_2 included in the new image group 38 are provided as the learning images 81 of the dementia opinion derivation model 80. In addition, one examination result among the plurality of examination results 14 included in the examination result group 16 and the plurality of first new examination results 42_1 and the plurality of second new examination results 42_2 included in the new examination result group 39 is provided as a learning examination result 82 of the dementia opinion derivation model 80. The dementia opinion derivation model 80 is a machine learning model that receives the normalization images 40 and the examination results 14 as input data and outputs dementia opinion information 83 as output data, the dementia opinion information 83 being information representing a dementia opinion of the patient P of the normalization images 40. The dementia opinion information 83 is any one of normal control (NC), mild cognitive impairment (MCI), and Alzheimer's disease (AD).

The dementia opinion derivation model 80 is configured by, for example, any method of a neural network, a support vector machine, and boosting. In a learning phase, the dementia opinion derivation model 80 is trained by inputting, to the dementia opinion derivation model 80, learning data 84 which is a set of the learning image 81, the learning examination result 82, and correct dementia opinion information 83CA. In a case where the learning image 81 and the learning examination result 82 are the normalization image 40 and the examination result 14, the correct dementia opinion information 83CA is a dementia opinion which is for the patient P of the normalization image 40 and the examination result 14 and is actually obtained by a doctor in charge of the patient P. In a case where the learning image 81 and the learning examination result 82 are the new image 41 and the new examination result 42, the correct dementia opinion information 83CA is a dementia opinion which is actually obtained by a doctor who receives a request with reference to the new image 41 and the new examination result 42.

In the learning phase, the learning images 81 and the learning examination results 82 are input to the dementia opinion derivation model 80. The dementia opinion derivation model 80 outputs learning dementia opinion information 83L in response to the learning images 81 and the learning examination results 82. A loss calculation of the dementia opinion derivation model 80 is performed based on the learning dementia opinion information 83L and the correct dementia opinion information 83CA. In addition, update settings of various coefficients of the dementia opinion derivation model 80 are performed according to a result of the loss calculation, and the dementia opinion derivation model 80 is updated according to the update settings.

In the learning phase, while exchanging the learning data 84, a series of pieces of processing, which includes inputting of the learning image 81 and the learning examination result 82 to the dementia opinion derivation model 80, outputting of the learning dementia opinion information 83L from the dementia opinion derivation model 80, the loss calculation, the update settings, and updating of the dementia opinion derivation model 80, is repeatedly performed. The repetition of the series of pieces of processing is ended in a case where prediction accuracy of the learning dementia opinion information 83L with respect to the correct dementia opinion information 83CA reaches a predetermined set level. The dementia opinion derivation model 80 of which the prediction accuracy reaches the set level in this way is used as a trained model in an operation phase.

Next, an operation according to the configuration will be described with reference to flowcharts illustrated in FIG. 12 and FIG. 13. First, in a case where the operation program 30 is started in the image processing apparatus 10, as illustrated in FIG. 4, the CPU 27 of the image processing apparatus 10 functions as the RW control unit 45, the normalization unit 46, the non-linear registration unit 47, and the generation unit 48. As illustrated in FIG. 8, the generation unit 48 includes the transformation coefficient generation unit 70 and the calculation unit 71.

Figure 12:
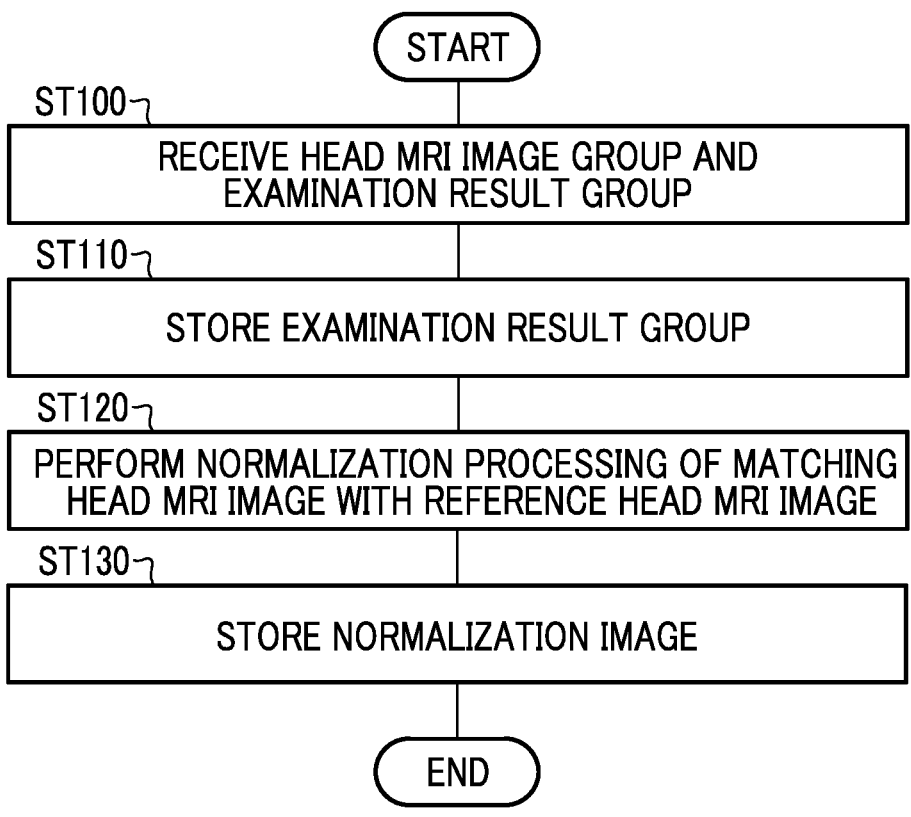
FIG. 12 is a flowchart illustrating a processing procedure of the image processing apparatus.

As illustrated in FIG. 12 as an example, first, the normalization unit 46 receives the head MRI image group 15 from the medical information database server 11. In addition, the RW control unit 45 receives the examination result group 16 from the medical information database server 11 (step ST100). The examination result group 16 is stored in the storage 25 by the RW control unit 45 (step ST110).

As illustrated in FIG. 5, the normalization unit 46 performs normalization processing (shape normalization processing 55 and shade normalization processing 56) of matching the head MRI image 13 with the reference image 35 (step ST120). Thereby, the head MRI image 13 is set as the normalization image 40. The normalization image 40 is output from the normalization unit 46 to the RW control unit 45, and is stored in the storage 25 by the RW control unit 45 (step ST130).

As illustrated in FIG. 13 as an example, the RW control unit 45 reads the first normalization image 40_1 and the first examination result 14_1, which are associated with each other by the patient ID 22, and the second normalization image 40_2 and the second examination result 14_2, which are associated with each other by the patient ID 22, from the storage 25 (step ST200). The first normalization image 40_1 and the second normalization image 40_2 are output from the RW control unit 45 to the non-linear registration unit 47 and the generation unit 48. In addition, the first examination result 14_1 and the second examination result 14_2 are output from the RW control unit 45 to the generation unit 48.

As illustrated in FIG. 6, the non-linear registration unit 47 performs non-linear registration processing of non-linearly registering the first normalization image 40_1 with the second normalization image 40_2. In addition, as illustrated in FIG. 7, the non-linear registration unit 47 performs non-linear registration processing of non-linearly registering the second normalization image 40_2 with the first normalization image 40_1 (step ST210). The transformation amounts T_12 and T_21 derived by the non-linear registration processing are output from the non-linear registration unit 47 to the generation unit 48, as the processing result 50.

As illustrated in FIG. 8, the generation unit 48 applies, to the first normalization image 40_1, the corrected transformation amount $\alpha$T_12 obtained by multiplying the transformation amount T_12 by the transformation coefficient $\alpha$, and generates the first new image 41_1 from the first normalization image 40_1. In addition, the generation unit 48 applies, to the second normalization image 40_2, the corrected transformation amount $\beta$T_21 obtained by multiplying the transformation amount T_21 by the transformation coefficient $\beta$, and generates the second new image 41_2 from the second normalization image 40_2. Further, the generation unit 48 generates the first new examination result 42_1 corresponding to the first new image 41_1 by using Equation (1), that is, the first calculation equation. Furthermore, the generation unit 48 generates the second new examination result 42_2 corresponding to the second new image 41_2 by using Equation (2), that is, the second calculation equation (step ST220). The first new image 41_1 and the first new examination result 42_1 and the second new image 41_2 and the second new examination result 42_2 are output from the generation unit 48 to the RW control unit 45, and are stored in the storage 25 by the RW control unit 45 (step ST230). In a case where the total number of the images and the examination results in the learning data group 36, that is, the number of the learning images 81 and the learning examination results 82 does not reach a target number (NO in step ST240), a series of processing of step ST200 to step ST230 is repeatedly performed while changing a combination of the first normalization image 40_1 and the first examination result 14_1 and the second normalization image 40_2 and the second examination result 14_2.

As described above, the generation unit 48 of the CPU 27 of the image processing apparatus 10 generates the first new image 41_1 and the second new image 41_2 under the generation condition, from the first normalization image 40_1 and the second normalization image 40_2 among the plurality of normalization images 40, as the learning data 84 used for training the dementia opinion derivation model 80 for the normalization image 40 and the examination result 14. In addition, the generation unit 48 generates, as the learning data 84, the first new examination result 42_1 and the second new examination result 42_2 by performing, based on the generation condition, calculation on the first examination result 14_1 of the medical examination that corresponds to the first normalization image 40_1 and the second examination result 14_2 of the medical examination that corresponds to the second normalization image 40_2. Therefore, it is possible to generate an examination result of a new medical examination in which consistency is maintained.

The non-linear registration unit 47 performs non-linear registration processing on the first normalization image 40_1 and the second normalization image 40_2. The generation unit 48 generates the first new image 41_1 and the second new image 41_2 by transforming the first normalization image 40_1 and the second normalization image 40_2 under the generation condition according to the processing result 50 of the non-linear registration processing. In addition, the generation unit 48 generates a first new examination result 42_1 corresponding to the first new image 41_1 from the first examination result 14_1, and generates a second new examination result 42_2 corresponding to the second new image 41_2 from the second examination result 14_2, by using Equation (1) and Equation (2) based on the generation condition.

The first new image 41_1 and the second new image 41_2 are generated based on the first normalization image 40_1 and the second normalization image 40_2. Therefore, it is possible to increase a variation of the learning image 81, as compared to a method described in <C. Shorten, T. M. Khoshgofttar: A survey on Image Data Augmentation, Journal of Big Data, 2019>, which generates the learning image 81 from one image. In addition, the first new image 41_1 and the second new image 41_2 are not obtained by mixing pixel values of the first normalization image 40_1 and the second normalization image 40_2. Thus, a form having an anatomical structure is not blurred as in a method described in <Y. Tokozume, Y. Ushiku, T. Harada: Between-class Learning for Image Classification, CVPR, 2018>. Therefore, it is possible to generate a comprehensive learning image 81 in which a form having an anatomical structure is maintained. In addition, it is possible to generate the first new examination result 42_1 and the second new examination result 42_2 in which more consistency is maintained.

The generation unit 48 sets the first normalization image 40_1 as the first new image 41_1 by applying, to the first normalization image 40_1, the corrected transformation amount $\alpha$T_12 obtained by multiplying the transformation amount T_12 from the first normalization image 40_1 to the second normalization image 40_2 in the non-linear registration processing by the transformation coefficient $\alpha$. Further, the generation unit 48 sets the second normalization image 40_2 as the second new image 41_2 by applying, to the second normalization image 40_2, the corrected transformation amount $\beta$T_21 obtained by multiplying the transformation amount T_21 from the second normalization image 40_2 to the first normalization image 40_1 in the non-linear registration processing by the transformation coefficient $\beta$. Therefore, in a case where the transformation coefficients $\alpha$ and $\beta$ are set to appropriate values, the desired first new image 41_1 and the desired second new image 41_2 can be obtained. For example, in a case where the transformation coefficient $\alpha$ is set to a value close to 0, the first new image 41_1 that is relatively similar to the first normalization image 40_1 is obtained. On the contrary, in a case where the transformation coefficient α is set to a value close to 1, the first new image 41_1 that is relatively similar to the second normalization image 40_2 is obtained.

The generation unit 48 converts the first examination result 14_1 and the second examination result 14_2 into the first new examination result 42_1 by calculating Equation (1) including the coefficient αF. In addition, the generation unit 48 converts the first examination result 14_1 and the second examination result 14_2 into the second new examination result 42_2 by calculating Equation (2) including the coefficient βF. Therefore, in a case where the coefficients αF and βF are set to appropriate values, the desired first new examination result 42_1 and the desired second new examination result 42_2 can be obtained. For example, in a case where the coefficient αF is set to a value close to 0, the first new examination result 42_1 that is relatively similar to the first examination result 14_1 is obtained. On the contrary, in a case where the coefficient αF is set to a value close to 1, the first new examination result 42_1 that is relatively similar to the second examination result 14_2 is obtained.

The head MRI image 13 and the normalization image 40 are classified into classes. The generation unit 48 changes the values of the transformation coefficients α and β and the values of the coefficients αF and βF depending on whether the classes 18 of the first normalization image 40_1 and the second normalization image 40_2 are the same or different from each other. Therefore, it is possible to generate the first new image 41_1 and the first new examination result 42_1 and the second new image 41_2 and the second new examination result 42_2 that are suitable depending on whether the classes 18 of the first normalization image 40_1 and the second normalization image 40_2 are the same or different from each other.

Figure 14:
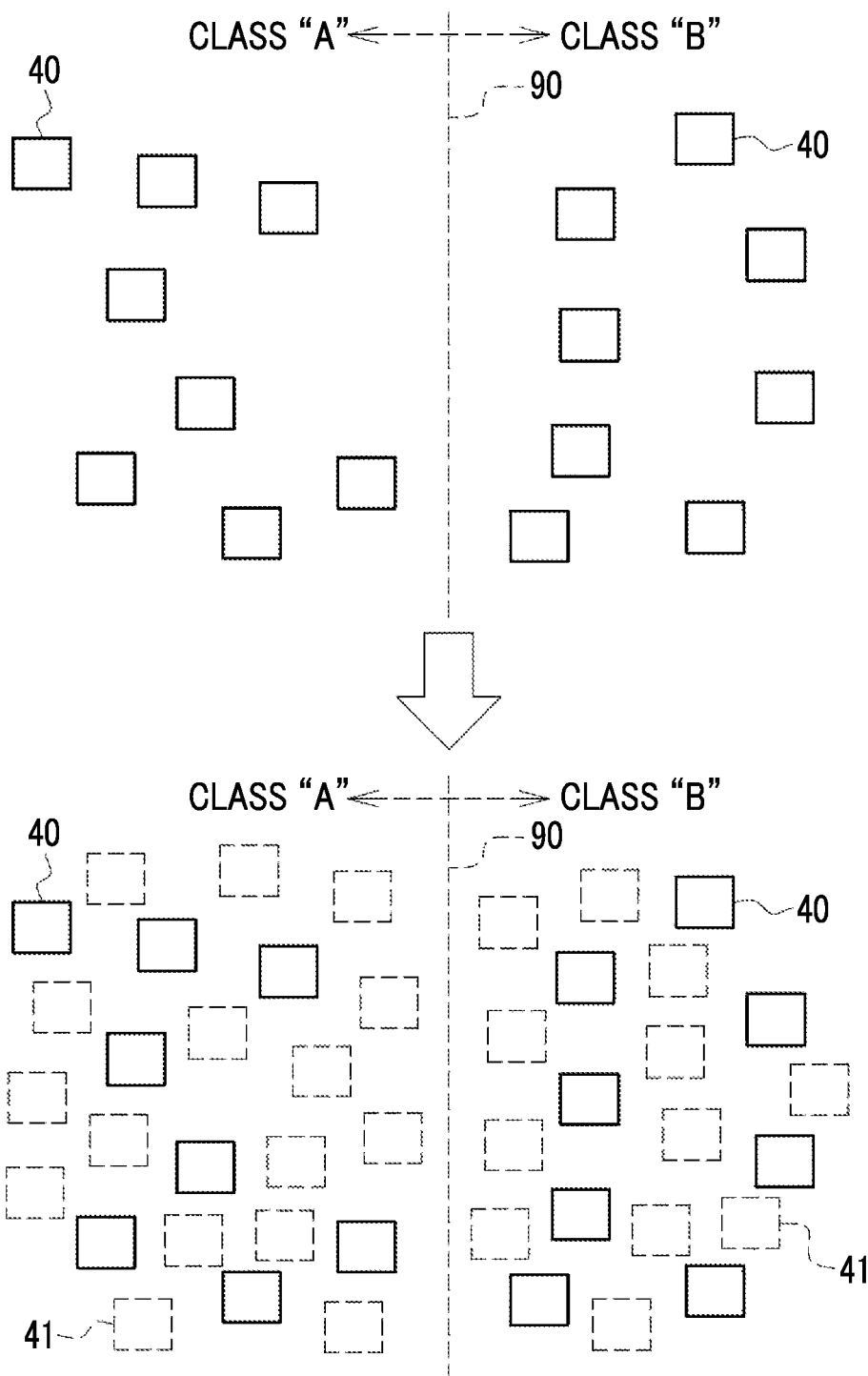
FIG. 14 is a diagram schematically illustrating a data distribution of images in each class.

As illustrated in FIGS. 9A to 10B, the generation unit 48 sets the class of the first new image 41_1 to be the same as the class 18 of the first normalization image 40_1, and sets the class of the second new image 41_2 to be the same as the class 18 of the second normalization image 40_2. Therefore, the class 18 that is suitable for a purpose of each of the first new image 41_1 and the second new image 41_2 can be associated. In addition, as schematically illustrated in FIG. 14, the new image 41 can be used to fill a data blank in each class 18 of "A" and "B" that cannot be filled by only the normalization image 40. Further, the new image 41 can be used to fill a data blank near a boundary 90 of each class 18 of "A" and "B".

As illustrated in FIG. 8, the transformation coefficients α and β are random numbers according to any one of the normal distributions 73 to 76. Therefore, it is possible to generate the first new image 41_1 and the second new image 41_2 that cannot be predicted from the first normalization image 40_1 and the second normalization image 40_2. Thereby, it is possible to increase a variation of the learning image 81.

As illustrated in FIG. 8, the means μ of the second α normal distribution 75 and the second β normal distribution 76 in a case where the classes of the first normalization image 40_1 and the second normalization image 40_2 are different from each other are smaller than the means μ of the first α normal distribution 73 and the first β normal distribution 74 in a case where the classes of the first normalization image 40_1 and the second normalization image 40_2 are the same. Therefore, in a case where the classes of the first normalization image 40_1 and the second normalization image 40_2 are different from each other, as compared with a case where the classes of the first normalization image 40_1 and the second normalization image 40_2 are the same, it is possible to generate the first new image 41_1, which is relatively similar to the first normalization image 40_1, and the second new image 41_2, which is relatively similar to the second normalization image 40_2. Therefore, even in a case where the class of the first new image 41_1 is set to be the same as the class 18 of the first normalization image 40_1 and the class of the second new image 41_2 is set to be the same as the class 18 of the second normalization image 40_2, there is no sense of incongruity.

As illustrated in FIG. 5, the normalization unit 46 performs normalization processing of matching the head MRI image 13 with the reference image 35, prior to the generation of the new image 41. Therefore, after an individual difference of the patient P and an apparatus difference of the MRI apparatus 17 are substantially eliminated, subsequent processing can be performed. Thereby, it is possible to improve reliability of the dementia opinion information 83.

The dementia has become a social problem with the advent of an aging society in recent years. Therefore, it can be said that the present embodiment in which a medical image is the head MRI image 13 and a machine learning model for the medical image is the dementia opinion derivation model 80 which outputs the dementia opinion information 83 is a form matching with the current social problem. In addition, a form having an anatomical structure, such as a degree of atrophy of a hippocampus, a parahippocampal gyms, an amygdala, or the like, provides a particularly important key in the dementia opinion. Thus, an effect of capable of generating the learning image 81 in which a form having an anatomical structure is maintained can be further exhibited.

The dementia opinion information 83 is not limited to the content illustrated in FIG. 11 (normal control/mild cognitive impairment/Alzheimer's disease). For example, as in the dementia opinion information 95 illustrated in FIG. 15, the dementia opinion information may indicate whether a degree of progression of dementia of the patient P one year later is fast or slow. Alternatively, as in the dementia opinion information 98 illustrated in FIG. 16, the dementia opinion information may be a type of dementia, such as Alzheimer's disease, dementia with Lewy body, or vascular dementia.

The embodiment in which both the first new image 41_1 and the first new examination result 42_1 and the second new image 41_2 and the second new examination result 42_2 are generated has been described. On the other hand, the present invention is not limited thereto. Any one set of the first new image 41_1 and the first new examination result 42_1 and the second new image 41_2 and the second new examination result 42_2 may be generated. For example, only the first new image 41_1 and the first new examination result 42_1 are generated.

Second Embodiment

Figure 17:
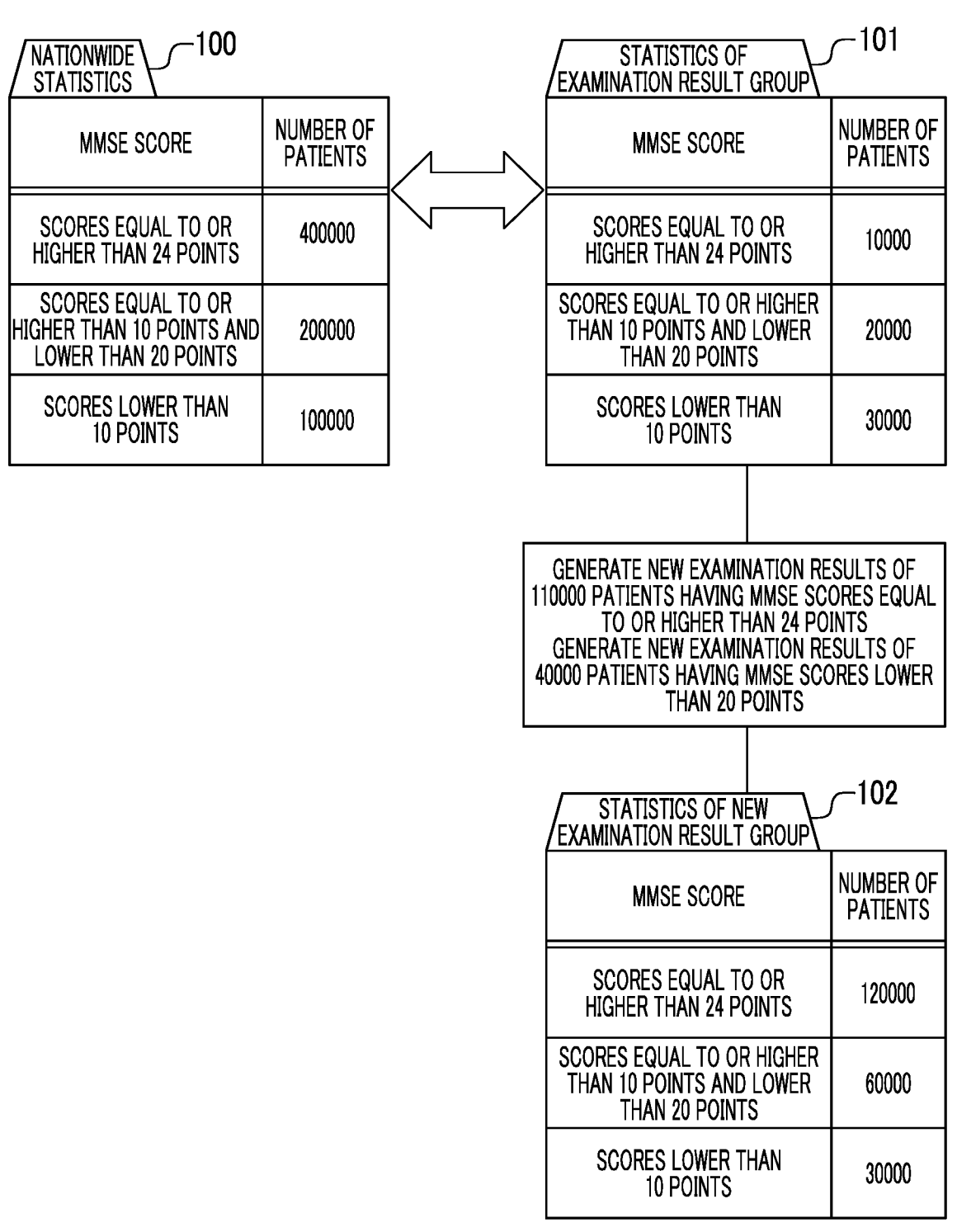
FIG. 17 is a diagram illustrating an example of a second embodiment in which new medical images and new examination results are generated in accordance with a tendency of examination results of a population of patients treated in the dementia opinion derivation model.

In a second embodiment illustrated in FIG. 17, the new image 41 and the new examination result 42 are generated in accordance with a tendency of the examination results 14 of a population of the patients P treated in the dementia opinion derivation model 80.

As illustrated in FIG. 17 as an example, in Japan nationwide statistics 100 of MMSE scores of patients P, a case where 400000 patients have scores equal to or higher than 24 points, 200000 patients have scores equal to or higher than 10 points and lower than 20 points, and 100000 patients have scores lower than 10 points is considered. Further, in statistics 101 of the examination result group 16, a case where 10000 patients have scores equal to or higher than 24 points, 20000 patients have scores equal to or higher than 10 points and lower than 20 points, and 30000 patients have scores lower than 10 points is considered. In this case, in order to match statistics 102 of the new examination result group 39 with the nationwide statistics 100, the generation unit 48 generates the new examination results 42 of 110000 patients having MMSE scores equal to or higher than 24 points (also generates the new images 41 of 110000 patients), and generates the new examination results 42 of 40000 patients having MMSE scores equal to or higher than 10 points and lower than 20 points (also generates the new images 41 of 40000 patients). Thereby, a ratio of the number of the patients in the nationwide statistics 100 and a ratio of the number of the patients in the statistics 102 of the new examination result group 39 match with each other, such as the number of the patients having scores equal to or higher than 24 points: the number of the patients having scores equal to or higher than 10 points and lower than 20 points: the number of the patients having scores lower than 10 points=4:2:1. The nationwide statistics 100 are an example of a "tendency of examination results of a population" according to the technique of the present disclosure.

There is a case where attributes of a patient P of the head MRI image 13 and the examination result 14 are different from attributes of a patient P treated in the dementia opinion derivation model 80, such as a case where the head MRI image 13 of the head MRI image group 15 and the examination result 14 of the examination result group 16 are, for example, a head MRI image and an examination result of a patient P in the United States of America and the patient P treated in the dementia opinion derivation model 80 is a Japanese. Further, even when the attributes of the patient P of the head MRI image 13 and the examination result 14 are the same as the attributes of the patient P treated in the dementia opinion derivation model 80, there is a case where a tendency of the examination result 14 of the examination result group 16 is different from a tendency of the examination results 14 of a population of the patients P treated in the dementia opinion derivation model 80. In such a case, the new image 41 and the new examination result 42 are generated without correcting the tendency of the examination result 14 of the examination result group 16. In a case where the dementia opinion derivation model 80 is trained based on the learning data group 36 prepared using the new image 41 and the new examination result 42, the dementia opinion derivation model 80 deviates from the tendency of the population of the patients P.

Therefore, in the second embodiment, the new image 41 and the new examination result 42 are generated in accordance with the tendency of the examination results 14 of the population of the patients P treated in the dementia opinion derivation model 80. Thereby, it is possible to generate the dementia opinion derivation model 80 that matches the tendency of the population of the patients P.

The non-linear registration processing may be performed on two new images 41, and the first new image 41_1 and the second new image 41_2 may be generated based on the processing result 50. Similarly, the first new image 41_1 and the second new image 41_2 may be generated from the normalization image 40 and the new image 41.

The class 18 is not limited to whether or not the patient develops dementia two years after in the example. For example, as in the dementia opinion information 83, any one of normal control/mild cognitive impairment/Alzheimer's disease may be registered as the class 18.

The transformation coefficients α and β may be fixed values instead of random numbers according to the normal distribution. In addition, the means μ of the first α normal distribution 73 and the first β normal distribution 74 in a case where the classes of the first normalization image 40_1 and the second normalization image 40_2 are the same are not limited to 0.5 in the example. For example, the mean μ may be 0.4 or 0.6. The coefficients αF and βF may also be, for example, 0.4 or 0.6. Similarly, the means μ of the second α normal distribution 75 and the second β normal distribution 76 in a case where the classes of the first normalization image 40_1 and the second normalization image 40_2 are different from each other are not limited to 0.2 in the example. For example, the mean μ may be 0.1 or 0.3. The coefficients αF and βF may also be, for example, 0.1 or 0.3. The standard deviation σ is also not limited to 0.2 in the example.

The new image 41 may be generated by using a data expansion method described in <Y. Tokozume, Y. Ushiku, T. Harada: Between-class Learning for Image Classification, CVPR, 2018>. For example, in a case where an image obtained by averaging pixel values of pixels of two different normalization images 40 is generated as the new image 41, a calculation equation of the new examination result 42 (denoted as MTR_N) is represented as Equation (3).

$$0.5 \times MTR\_1 + 0.5 \times MTR\_2 = MTR\_N \tag{3}$$

The training of the dementia opinion derivation model 80 illustrated in FIG. 11 may be performed by the image processing apparatus 10, or may be performed by an apparatus other than the image processing apparatus 10. Similarly, an operation of actually inputting the normalization image 40 and the examination result 14 to the dementia opinion derivation model 80 and outputting the dementia opinion information 83 from the dementia opinion derivation model 80 may also be performed in the image processing apparatus 10, or may be performed by an apparatus other than the image processing apparatus 10. In addition, the training of the dementia opinion derivation model 80 may be continued even after the operation.

The medical information database server 11 may perform some or all functions of each of the processing units 45 to 48. For example, the normalization unit 46 may be included in the CPU of the medical information database server 11, and the non-linear registration unit 47 and the generation unit 48 may be included in the CPU of the image processing apparatus 10.

The medical image is not limited to the head MRI image 13 in the example. The medical image may be a positron emission tomography (PET) image, a single photon emission computed tomography (SPECT) image, a computed tomography (CT) image, an endoscopic image, an ultrasound image, or the like.

The subject is not limited to the head in the example, and may be a chest, an abdomen, or the like. In addition, the disease is not limited to dementia in the example, and may be a heart disease, pneumonia, dyshepatia, or the like.

In each of the embodiments, for example, as a hardware structure of the processing unit that executes various processing, such as the RW control unit 45, the normalization unit 46, the non-linear registration unit 47, the generation unit 48, the transformation coefficient generation unit 70, and the calculation unit 71, the following various processors may be used. The various processors include, as described above, the CPU 27 which is a general-purpose processor that functions as various processing units by executing software (an operation program 30), a programmable logic device (PLD) such as a field programmable gate array (FPGA) which is a processor capable of changing a circuit configuration after manufacture, a dedicated electric circuit such as an application specific integrated circuit (ASIC) which is a processor having a circuit configuration specifically designed to execute specific processing, and the like.

One processing unit may be configured by one of these various processors, or may be configured by a combination of two or more processors having the same type or different types (for example, a combination of a plurality of FPGAs and/or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by system on chip (SoC), there is a form in which a processor that realizes the functions of the entire system including a plurality of processing units with one integrated circuit (IC) chip is used. As described above, the various processing units are configured by using one or more various processors as a hardware structure.

Further, as the hardware structure of the various processors, more specifically, an electric circuit (circuitry) in which circuit elements such as semiconductor elements are combined may be used.

The technique of the present disclosure can also appropriately combine the various embodiments and/or the various modification examples. In addition, the technique of the present disclosure is not limited to each embodiment, and various configurations may be adopted without departing from the scope of the present disclosure. Further, the technique of the present disclosure extends to a program and a storage medium for non-temporarily storing the program.

The described contents and the illustrated contents are detailed explanations of a part according to the technique of the present disclosure, and are merely examples of the technique of the present disclosure. For example, the descriptions related to the configuration, the function, the operation, and the effect are descriptions related to examples of a configuration, a function, an operation, and an effect of a part according to the technique of the present disclosure. Therefore, it goes without saying that, in the described contents and illustrated contents, unnecessary parts may be deleted, new components may be added, or replacements may be made without departing from the spirit of the technique of the present disclosure. Further, in order to avoid complications and facilitate understanding of the part according to the technique of the present disclosure, in the described contents and illustrated contents, descriptions of technical knowledge and the like that do not require particular explanations to enable implementation of the technique of the present disclosure are omitted.

In this specification, "A and/or B" is synonymous with "at least one of A or B". That is, "A and/or B" means that only A may be included, that only B may be included, or that a combination of A and B may be included. Further, in this specification, even in a case where three or more matters are expressed by being connected using "and/or", the same concept as "A and/or B" is applied.

All documents, patent applications, and technical standards mentioned in this specification are incorporated herein by reference to the same extent as in a case where each document, each patent application, and each technical standard are specifically and individually described by being incorporated by reference.

What is claimed is:

1. An image processing apparatus comprising:
a processor; and
a memory connected to or built in the processor,
wherein the processor is configured to
generate, as learning data used for training a machine learning model with medical images and correct data and examination results of medical examinations, new medical images from a first medical image and a second medical image among a plurality of the medical images according to a generation condition, wherein the correct data is a medical image that has been classified into a correct class based on the examination results of the medical examinations, and
generate new examination results, as the learning data used for training the machine learning model with the medical images and the correct data and the examination results of the medical examinations, by performing calculation based on the generation condition on a first examination result of the medical examination corresponding to the first medical image and a second examination result of the medical examination corresponding to the second medical image, wherein the generation condition depends on whether classes of the first medical image and the second medical image are the same or different from each other.

2. The image processing apparatus according to claim 1, wherein the processor is configured to
perform non-linear registration processing on the first medical image and the second medical image,
generate a first new medical image and a second new medical image by transforming the first medical image and the second medical image under the generation condition according to a result of the non-linear registration processing, and
generate a first new examination result corresponding to the first new medical image and a second new examination result corresponding to the second new medical image from the first examination result and the second examination result by using a calculation equation based on the generation condition.

3. The image processing apparatus according to claim 2, wherein the processor is configured to
set the first medical image as the first new medical image by applying, to the first medical image, a corrected transformation amount $\alpha T\_12$ obtained by multiplying a transformation amount $T\_12$ from the first medical image to the second medical image in the non-linear registration processing by a transformation coefficient $\alpha$, and convert the first examination result and the second examination result into the first new examination result by calculating a first calculation equation including the transformation coefficient $\alpha$ or a coefficient $\alpha F$, and
set the second medical image as the second new medical image by applying, to the second medical image, a corrected transformation amount $\beta T\_21$ obtained by multiplying a transformation amount $T\_21$ from the second medical image to the first medical image in the non-linear registration processing by a transformation coefficient $\beta$, and convert the first examination result and the second examination result into the second new examination result by calculating a second calculation equation including the transformation coefficient β or a coefficient βF.

4. The image processing apparatus according to claim 3, wherein the medical images are classified into classes, and the processor is configured to change at least one of values of the transformation coefficients α and β, the coefficient αF, or the coefficient βF depending on whether the classes of the first medical image and the second medical image are the same or different from each other.

5. The image processing apparatus according to claim 4, wherein the processor is configured to set a class of the first new medical image to be the same as the class of the first medical image, and set a class of the second new medical image to be the same as the class of the second medical image.

6. The image processing apparatus according to claim 3, wherein the transformation coefficients α and β are random numbers according to a normal distribution.

7. The image processing apparatus according to claim 6, wherein the medical images are classified into classes, the processor is configured to change at least one of values of the transformation coefficients α and β, the coefficient αF, or the coefficient βF depending on whether the classes of the first medical image and the second medical image are the same or different from each other, and a mean of a normal distribution in a case where the classes of the first medical image and the second medical image are different from each other is smaller than a mean of a normal distribution in a case where the classes of the first medical image and the second medical image are the same.

8. The image processing apparatus according to claim 6, wherein the medical images are classified into classes, the processor is configured to change at least one of values of the transformation coefficients α and β, the coefficient αF, or the coefficient βF depending on whether the classes of the first medical image and the second medical image are the same or different from each other, set a class of the first new medical image to be the same as the class of the first medical image, set a class of the second new medical image to be the same as the class of the second medical image, and a mean of a normal distribution in a case where the classes of the first medical image and the second medical image are different from each other is smaller than a mean of a normal distribution in a case where the classes of the first medical image and the second medical image are the same.

9. The image processing apparatus according to claim 1, wherein the processor is configured to generate the new medical images and the new examination results in accordance with a tendency of the examination results of a population of patients treated in the machine learning model.

10. The image processing apparatus according to claim 1, wherein the processor is configured to perform normalization processing of matching the first medical image and the second medical image with a reference medical image prior to generation of the new medical images.

11. The image processing apparatus according to claim 1, wherein the medical image is an image in which a head of a patient appears, and the machine learning model is a model that outputs a dementia opinion on the patient.

12. An operation method of an image processing apparatus, the method comprising:

generating, as learning data used for training a machine learning model with medical images and correct data and examination results of medical examinations, new medical images from a first medical image and a second medical image among a plurality of the medical images according to a generation condition, wherein the correct data is a medical image that has been classified into a correct class based on the examination results of the medical examinations; and generating new examination results, as the learning data used for training the machine learning model with the medical images and the correct data and the examination results of the medical examinations and the correct data, by performing calculation based on the generation condition on a first examination result of the medical examination corresponding to the first medical image and a second examination result of the medical examination corresponding to the second medical images wherein the generation condition depends on whether classes of the first medical image and the second medical image are the same or different from each other.

13. A non-transitory computer-readable storage medium storing an operation program of an image processing apparatus, the program causing a computer to execute a process comprising:

generating, as learning data used for training a machine learning model with medical images and correct data and examination results of medical examinations, new medical images from a first medical image and a second medical image among a plurality of the medical images according to a generation condition, wherein the correct data is a medical image that has been classified into a correct class based on the examination results of the medical examinations; and generating new examination results, as the learning data used for training the machine learning model with the medical images and the correct data and the examination results of the medical examinations and the correct data, by performing calculation based on the generation condition on a first examination result of the medical examination corresponding to the first medical image and a second examination result of the medical examination corresponding to the second medical images, wherein the generation condition depends on whether classes of the first medical image and the second medical image are the same or different from each other.

* * * * *